US006707441B1

(12) United States Patent
Hebiguchi et al.

(10) Patent No.: US 6,707,441 B1
(45) Date of Patent: Mar. 16, 2004

(54) ACTIVE MATRIX TYPE LIQUID CRYSTAL DISPLAY DEVICE, AND SUBSTRATE FOR THE SAME

(75) Inventors: Hiroyuki Hebiguchi, Miyagi-ken (JP); Ken Kawahata, Miyagi-ken (JP)

(73) Assignees: LG Philips LCD Co., Ltd. (KR); Alps Electric Co., Ltd. (JP)

( * ) Notice: Subject to any disclaimer, the term of this patent is extended or adjusted under 35 U.S.C. 154(b) by 0 days.

(21) Appl. No.: 09/302,641

(22) Filed: Apr. 30, 1999

(30) Foreign Application Priority Data

May 7, 1998 (JP) .......................................... 10-125028
Jun. 2, 1998 (JP) .......................................... 10-153352

(51) Int. Cl.$^{7}$ ........................... G09G 3/36; G02F 1/133
(52) U.S. Cl. ........................................... 345/92; 349/59
(58) Field of Search ........................... 345/92, 100, 87; 349/55, 39, 59

(56) References Cited

U.S. PATENT DOCUMENTS 5,121,236 A * 6/1992 Ukai et al. .................... 257/72
5,151,689 A 9/1992 Kabuto et al. .............. 345/103
5,235,448 A * 8/1993 Suzuki et al. ................. 349/43
5,684,365 A * 11/1997 Tang et al. ................. 257/448
5,852,425 A * 12/1998 Bird et al. .................... 345/92
5,870,071 A * 2/1999 Kawahata ................... 345/100
5,894,299 A * 4/1999 Tsuchiya et al. ............ 345/100
5,907,314 A * 5/1999 Negishi et al. ............. 345/103
5,945,256 A * 8/1999 Kim et al. .................. 430/312
6,011,530 A * 1/2000 Kawahata et al. ............ 345/90
6,067,064 A * 5/2000 Furuhashi et al. ............ 345/89
6,075,505 A * 6/2000 Shiba et al. .................. 345/87
6,100,868 A * 8/2000 Jeong et al. .................. 345/98
6,115,018 A * 9/2000 Okumura et al. ............. 345/95

* cited by examiner

*Primary Examiner*—Richard Hjerpe
*Assistant Examiner*—Kevin M. Nguyen
(74) *Attorney, Agent, or Firm*—Brinks Hofer Gilson & Lione

(57) ABSTRACT

An active matrix type liquid crystal display device has a plurality of data lines and a plurality of gate lines formed on a substrate in matrix fashion, TFTs and pixel electrodes being provided at both sides of the data lines so as to correspond with each of the plurality of gate lines, and the plurality of gate lines are positioned such that the pixel electrodes at both sides of the data lines are controlled by signals from one of the two gate lines sandwiching the pixel electrodes, i.e., either the first or second gate line. Also, the gate electrodes comprising TFTs are comprised of gate lines themselves, so that the drain electrodes electrically connected to the pixel electrodes traverse the gate electrodes. Thus, the pixels can be driven with fewer data lines than with known arrangements.

37 Claims, 23 Drawing Sheets

CgdL1=CgdR1

CgdL2=CgdR2

CgdL3=CgdR3

CgdL4≠CgdR4

ACTIVE MATRIX TYPE LIQUID CRYSTAL DISPLAY DEVICE, AND SUBSTRATE FOR THE SAME

BACKGROUND OF THE INVENTION

1. Field of the Invention

The present invention relates to an active matrix type liquid crystal display device, and a matrix substrate used for this liquid crystal display device.

2. Description of the Related Art

It is known that an active matrix type liquid crystal display device is formed by facing two glass substrates against each other and fixing these, with liquid crystal being sealed in the gap therebetween. A transparent common electrode is formed on one glass substrate, and a great many transparent pixel electrodes are formed in matrix fashion on the other glass substrate, with circuitry also being formed for applying voltage individually to each of the electrodes.

FIG. 22 illustrates a common configuration of such an active matrix type liquid crystal display device, and more specifically is a plan view of the side of the device on which the pixel electrodes have been formed.

This active matrix type liquid crystal display device has a pixel matrix PX (i, j) of m rows and n columns (wherein i=1 to m and j=1 to n), a portion thereof being shown in FIG. 22. In the Figure, rectangles arrayed vertically and horizontally are represented by broken lines, each representing a pixel.

As shown in the Figure, the pixels are arrayed horizontally (in the column direction) and vertically (in the row direction), with an n number of data lines Dj (j=1 to n) corresponding with each column of these pixels being formed, and further, an m number of gate lines Gi (i=1 to m) corresponding with each column of these pixels are formed. Now, each of the data lines Dj (j=1 to n) are lines for supplying signal voltage to each pixel PX (i, j) (i=1 to m, j=1 to n). Also, each of the gate lines Gi (i=1 to m) are lines for supplying gate voltage to each pixel PX (i, j) (i=1 to m, j=1 to n), for writing the signal voltage to the pixels.

In addition to the above pixel electrode, each pixel PX (i, j) has a TFT (Thin-Film Transistor) 1. This TFT 1 has the source electrode thereof connected to the data line Dj, the gate electrode connected to the gate line Gi, and the drain electrode connected to the pixel electrode. Now, liquid crystal is sandwiched between the pixel electrode and the above-mentioned common electrode. The capacity 2 shown in FIG. 22 represents the liquid crystal capacity sandwiched between the pixel electrode and the common electrode. The TFT 1 serves as a switching device for switching between whether or not to write to the pixel, i.e., whether or not to apply the signal voltage supplied via the data line Dj to this liquid crystal capacity 2.

Next, description will be made regarding the operation of this active matrix type liquid crystal display device. With this active matrix type liquid crystal display device, an m number of gate lines Gi (i=1 to m) are sequentially scanned, and one screen image is displayed for each field cycle. Now, there are two types of methods for scanning gate lines, i.e., interlaced and non-interlaced. FIG. 23 is an example wherein m=480, and illustrates the scanning order of date lines in the two methods.

With the non-interlaced method, one field cycle is used to sequentially apply gate voltage to the 480 gate lines G1 through G480 at a certain time each, following which the same operation is performed each time the field cycle is renewed, as shown in FIG. 23. Such applying of gate voltage to the gates is performed by an unshown gate driver.

In each field cycle, gate voltage is applied to each gate line G1 though G480 once. Now, let us say that gate voltage has been applied to a gate line Gi. The gate voltage is applied to the gate of each TFT 1 of the n number of pixels PX (i, j) (j=1 to n) comprising the No. i row of the pixel matrix, so these TFTs 1 are conducting. Also, during the period wherein gate voltage is being applied to this gate line Gi, n pixels worth of signal voltage is output from unshown data drivers to each of an n number of data lines Dj (j=1 to n). The n pixels worth of signal voltage is applied to each of the liquid crystal capacities 2 of each of the pixels PX (i, j) (j=1 to n) by means of passing though the above conducting TFTs 1. Consequently, one horizontal scanning line of the image is displayed by the n number of pixels PX (i, j) (j=1 to n). Such applying of date voltage and signal voltage is performed for the first row of the pixel matrix to the 480th thereof, thereby displaying the image for one screen.

Conversely, with the interlaced method, as shown to the right in FIG. 23, in a field sequence, gate voltage is applied to the odd-numbered gate lines G1, G3, G5, and so forth through G 479, for example, following which in the next field sequence, gate voltage is applied to the even-numbered gate lines G2, G4, G6, and so forth through G 480, i.e., different gate lines are scanned in the field cycles, so the operation of displaying the image for one screen with two field cycles is repeated.

With the interlaced method, each gate line Gi is applied with date voltage only once every two field cycles, and thus is advantageous in that electrical power consumption can be conserved.

Now, the above-described known active matrix type liquid crystal display device has data lines for each column comprising the pixel matrix, so in the event that there is a great number of pixels per row, a great many number of data drivers need to be used, accordingly. However, data drivers are relatively expensive parts, and using a great number of these would make the entire device expensive. For example, a VGA liquid display panel with 1920 pixels in the column direction and 480 pixels in the row direction has 1920 data lines and 480 gate lines. In the event that data drivers and gate drivers having 240 output terminals were used to construct this liquid crystal panel according to the above-described known technique, there is the need to provide eight data drivers in the column direction and two gate drivers in the row direction. Using eight data drivers would make the liquid crystal panel expensive.

Also, the above-described known technique has been problematic in that it has been difficult to construct a liquid crystal display panel with a small display area. That is, a great number of terminals for supplying signal voltage to the above data lines are provided at the data line terminal portion which is the edge portion of the liquid crystal display panel, and this data line terminal portion needs to be reduced in size for a liquid crystal display panel with a small display area. In order for this data line terminal portion to be reduced in size, the pitch of the terminals corresponding to the above data lines must be narrowed, but the liquid crystal panel according to the known technique uses a great number of data lines, so the requirement to narrow this pitch is severely demanding. Accordingly, manufacturing of the data wiring terminal portion is more difficult, which in turn causes problems such as decrease in yield.

SUMMARY OF THE INVENTION

The present invention has been made in light of the above-described problems, and accordingly, it is an object of the present invention to provide an active matrix type liquid crystal display device which can drive each pixel with a fewer number of data lines as compared to the known art, and to provide a substrate used for the same.

The active matrix type liquid crystal display device substrate according to the present invention is arranged such that a plurality of data lines and a plurality of gate lines are provided on a substrate in a matrix form, and that on either side of each of the data lines are provided TFTs and pixel electrodes connecting to the TFTs, corresponding with each of the plurality of gate lines, wherein the plurality of data lines are provided so as to control the pixel electrodes on either side of the data lines, by signals from the corresponding one of the two gate lines on either side of each of the pixel electrodes.

With active matrix type liquid crystal display device substrate according to the present invention, one data line supplies signal voltage to the pixel electrodes positioned on either side thereof. Also, signal voltage is written to half of the pixel electrodes arrayed along the gate line by applying gate voltage to one of the two gate lines positioned on either side of pixel electrodes on either side of the data line, and signal voltage is written to the other half of the pixels by applying gate voltage to the other gate line. Thus, with the substrate according to the present invention, the number of data lines is reduced to half of that of known arrangements, thereby facilitating reduction of the expensive data drivers to half.

Also, it is preferable that the gate electrodes forming the TFTs are comprised of the gate lines themselves, and the drain electrodes which comprise the TFTs and are electrically connected to the pixel electrodes traverse the gate electrodes.

With such an arrangement, even in the event that there is shifting of the photo mask between the gate electrode forming step and drain electrode forming step in the process of manufacturing the active matrix type liquid crystal display device substrate, the parasitic capacity Cgd between the gate and drain of the two TFTs sandwiched between neighboring data lines is equal as in a normal case, and the field-through voltage ΔVp is also equal, thereby facilitating prevention of flickering and irregularities in brightness.

Also, the active matrix type liquid crystal display device substrate according to the present invention may be arranged such that storing capacity is provided corresponding to each of the pixel electrodes, and storing capacity lines are provided parallel to the data lines, between neighboring pixel electrodes between neighboring data lines, and that one of the electrodes of the storing capacity is connected to a pixel electrode corresponding thereto, and the other electrode is connected to the storing capacity line.

According to the present invention, storing capacity is connected to each pixel electrode, so the capability for each pixel to hold signal voltage can be improved. Also, two pixels worth of writing current flow to each storing capacity line from each storing capacity on either side. Accordingly, outputting signal voltage to each data line so that signal voltage of reverse polarity is applied to neighboring data lines causes cancellation of writing current flowing through each of the storing capacity lines, thereby preventing insufficient writing from occurring.

The active matrix type liquid crystal display device according to the present invention comprises a pair of opposedly positioned substrates whereby liquid crystal is held therebetween, wherein one of the substrates is the above-described substrate.

Also, the active matrix type liquid crystal display device according to the present invention comprises scanning means wherein an action of sequentially supplying gate voltage to one of the two gate lines provided on either side of the pixel, and an action of sequentially supplying gate voltage to the other of the two gate lines provided on either side of the pixel, are alternately performed each time a field cycle switches.

According to the present invention, signal voltage is written to all pixels in the pixel matrix over a period of two field cycles. Accordingly, consumption of electricity at the time of writing signal voltage can be reduced.

Also, the active matrix type liquid crystal display device according to the present invention comprises: gate drivers for sequentially outputting gate voltage from output terminals in each field cycle; and demultiplexers wherein an action of sequentially supplying gate voltage to one of the two gate lines provided on either side of the pixel, and an action of sequentially supplying gate voltage to the other of the two gate lines provided on either side of the pixel, are alternately performed each time a field cycle switches, the gate voltage being sequentially output from the output terminals of the gate drivers; wherein the demultiplexer and the pixel are manufactured by the same manufacturing process.

According to the present invention, advantages similar to those of the above device can be obtained. Also, the number of gate drivers can be reduced, by providing the demultiplexer. Further, the demultiplexer and the pixels are manufactured by the same manufacturing process, so manufacturing can be carried out without increasing costs.

Further, the active matrix type liquid crystal display device according to the present invention comprises: a first shift register which sequentially shifts first start pulses and supplies output signals from each stage as gate voltage to one of the two gate lines provided on either side each of the pixel electrodes; and a second shift register which sequentially shifts second start pulses and supplies output signals from each stage as gate voltage to the other of the two gate lines provided on either side each of the pixel electrodes; wherein the first and second shift registers, and the pixel are manufactured by the same manufacturing process.

According to the present invention, advantages similar to those of the above device can be obtained. Also, providing the first and second shift registers does away with the need for external attachment of gate drivers. Further, the shift registers and the pixels are manufactured by the same manufacturing process, so manufacturing can be carried out without increasing costs.

Also, the active matrix type liquid crystal display device substrate according to the present invention comprises: a plurality of data lines and a plurality of gate lines provided on a substrate in a matrix form; and TFTs and pixel electrodes connecting to the TFTs provided on one side of each of the data lines, corresponding with each of the plurality of gate lines; wherein drain electrodes comprising the TFTs connecting to the pixel electrodes are provided on the same side as gate electrodes extending from the gate lines and comprising the TFTs, with a certain number of the data lines being electrically connected; and wherein the plurality of gate lines are provided so as to control the thin film transistors connected to each of the certain number of data lines, each by a different gate line.

Several types of configurations can be conceived for an active matrix type liquid crystal display device substrate whereby dots can be driven with fewer data lines than known arrangements, but the present invention further aims to provide a active matrix type liquid crystal display device with reduced flickering. This will be described next.

FIG. 24 is an example of a active matrix type liquid crystal display device substrate wherein the number of data lines has been reduced to half of that of known arrangements. This is an arrangement wherein dots from two columns PX (i, j) and PX (i, j+1) (wherein i=1 to m for both) are positioned on either side of a data line Dj+1 and both share the same data line Dj+1, whereby the number of data lines is reduced and the number of data drivers can be accordingly reduced. Also, in each row, the two dots which are on both sides of the data line Dj+1, e.g., dot PX (i, j) and PX (i, j+1) are driven by different gate lines GAi and GBi. As a result of such a configuration, the TFTs 121*a* and 121*b* for these two dots PX (i, j) and PX (i, j+1) are positioned in point symmetry with the center point of the two dots as the center thereof, and the positions of the drain and source of the TFTs 121*a* and 121*b* are reversed as to the gate (in the horizontal direction in the Figure).

FIG. 25A and FIG. 25B are diagrams illustrating the portion of the TFTs 121*a* and 121*b* of the above two dots PX (i, j) and PX (i, j+1). For the sake of simplicity in the description, the dot PX (i, j) to the left of the data line will be referred to as dot "a", and the dot PX (i, j+1) to the right of the data line will be referred to as dot "b".

Generally, there is gate-drain parasitic capacity Cgd at the overlapping portion of the gate electrode and drain electrode of the TFT (in reality, the overlapping portion of the island and gate electrode also affects Cgd), but the area of this overlapping portion differs one from another due to the process precision (specifically, the alignment precision of the exposing apparatus) in the process of manufacturing, so there are irregularities in the gate-drain parasitic capacity Cgd.

In the event that the TFTs 121*a* and 121*b* of dot a and dot b are mutually positioned in point symmetry, and if the position of the drain layer to the gate layer is as designed as shown in FIG. 25A, the dimensions La and Lb of the overlapping portions of the gate electrodes 122*a* and 122*b* of the TFTs 121*a* and 121*b* of dot a and dot b and the drain electrodes 123*a* and 123*b* thereof are of equal dimension (including the dimensions from the island center to the drain electrode tip), and with the gate-drain parasitic capacity of dot a as Cgda, and the gate-drain parasitic capacity of dot b as Cgdb, Cgda=Cgdb holds. However, as shown in FIG. 25B, in the event that the drain layer shifts to the left direction in comparison with the gate layer for example, the dimensions L'b of the overlapping portion of the gate electrode 122*b* and drain electrode 123*b* of the TFTs 121*b* of dot b becomes greater than the dimensions L'a of the overlapping portion of the gate electrode 122*a* and drain electrode 123*a* of the TFTs 121*a* of dot a. Consequently, the relation in the gate-drain parasitic capacity of dot a and dot b is C'gda<C'gdb (to be more precise, the overlapping portion of the island and gate electrode is also included in the parasitic capacity). That is to say, in the event that the TFTs are at positions of point symmetry in the substrate, the gate-drain parasitic capacity varies within the same substrate depending on the alignment precision of the exposing apparatus.

Now, in the event that gate voltage Vg is applied to a TFT, the field-through voltage ΔVp is expressed as follows:

$$\Delta Vp=\{(Cgd)/(Clc+Cs+Cgd)\}\cdot Vg$$

wherein Clc represents liquid crystal capacity, and Cs represents storing capacity.

Accordingly, in the event that the gate-drain parasitic capacity Cgd differs, the field-through voltage ΔVp changes. Also, based on the relation between the field-through voltage and the offset voltage, change in the field-through voltage means that the offset voltage also changes, so differences in the gate-drain parasitic capacity changes the offset voltage. Accordingly, in the case of a TFT substrate of the above configuration, the offset voltage differs within the same substrate from dot to dot, so offset adjusting cannot be performed for all dots. This is what causes flickering.

The active matrix type liquid crystal display device substrate according to the present invention aims to maintain the idea of sharing a data line with a plurality of dots on the same row, while at the same time suppressing flickering owing to the process precision. To this end, as described above, the TFTs are provided on the same side of each of the data lines, and the drain electrodes of each of the TFTs are provided on the same side as the gate electrodes. That is, instead of positioning the TFTs in point symmetry, the positional relation of the source electrode and drain electrode of each TFT is the same for all of the TFTs on the substrate. Accordingly, even in the event that the alignment of the drain layer to the gate layer shifts, all of the TFTs on the substrate shift in the same direction, so the gate-drain parasitic capacity is equal for all TFTs, and consequently the offset voltage is uniform throughout the substrate. Hence, flickering can be suppressed.

Also, even in the event that data lines are provided for each column, the number of data lines can be reduced at the connection portion with the data driver by a certain number of data lines being electrically connected, so the number of data drivers can be reduced. Accordingly, the same data signals are supplied to the above certain number of data lines, but driving can be performed without obstruction by controlling each of the TFTs connected to each of the data lines of the electrically connected data lines with differing gate lines.

Also, it is preferable that the certain number of electrically connected data lines be mutually connected at both sides of the data lines, at least.

In the case of electrically connecting a certain number of data lines, mutual connection at only the one place on the side to be connected to the data driver is sufficient from a functional perspective, but an arrangement wherein the data lines are mutually connected at both sides can prevent line dropout, since even in the event that one place in a data line is broken, supply of the signals is not stopped. That is, this arrangement serves as a redundant structure regarding line dropout, thus improving yield.

Also, it is preferable that the configuration be an arrangement wherein the plurality of data lines are electrically connected at intervals of odd numbers, in increments of the certain number.

In order to improve display quality, and reduce cross-talk in particular, the so-called data line inversion driving method is generally used, wherein data signals of differing polarity are supplied to the even-numbered data lines and the odd-numbered data lines. However, with the present invention, in the event that neighboring data lines are electrically connected, dots corresponding with the electrically connected data lines may be of the same polarity, and the pixel potential be affected by coupling owing to parasitic capacity, so that data line inversion driving doers not effectively function.

Conversely, in the event that data lines are electrically connected at intervals of odd numbers, supplying signals of inverse polarity for each set of connected data lines ensures that the polarity will always be reverse between two neighboring data lines, so data line inversion driving effectively functions regarding an arbitrary dot. Consequently, cross-talk is reduced, and display quality is improved.

It is also preferable that the configuration be an arrangement wherein one or more but the certain number or less of gate lines are layered upon the pixel electrodes so as to traverse the pixel electrodes. In such an arrangement, the one or more but the certain number or less of gate lines, and the pixel electrodes cooperate to form storing capacity.

That is, with the present invention, the TFTs of each of the data lines of the electrically connected data lines are each controlled by different gate lines, so observation of one dot reveals a gate line for controlling another TFT traversing the dot. However, the area wherein the gate line traverses the dot can be used as storing capacity, so the arrangement wherein the gate lines traverse the dots does not lead to deterioration in aperture ratio.

Thus, the active matrix type liquid crystal display device according to the present invention can be constructed by holding liquid crystal between the above active matrix type liquid crystal display substrate and a substrate upon which a common electrode is provided.

With the active matrix type liquid crystal display device according to the present invention, the number of data drivers can be reduced as compared with known arrangements, which reduces the cost, and a liquid crystal device with high display quality can be provided, with reduced flickering.

DESCRIPTION OF THE PREFERRED EMBODIMENTS

Embodiments of the present invention will now be described with reference to the drawings.

First Embodiment

Figure 1:
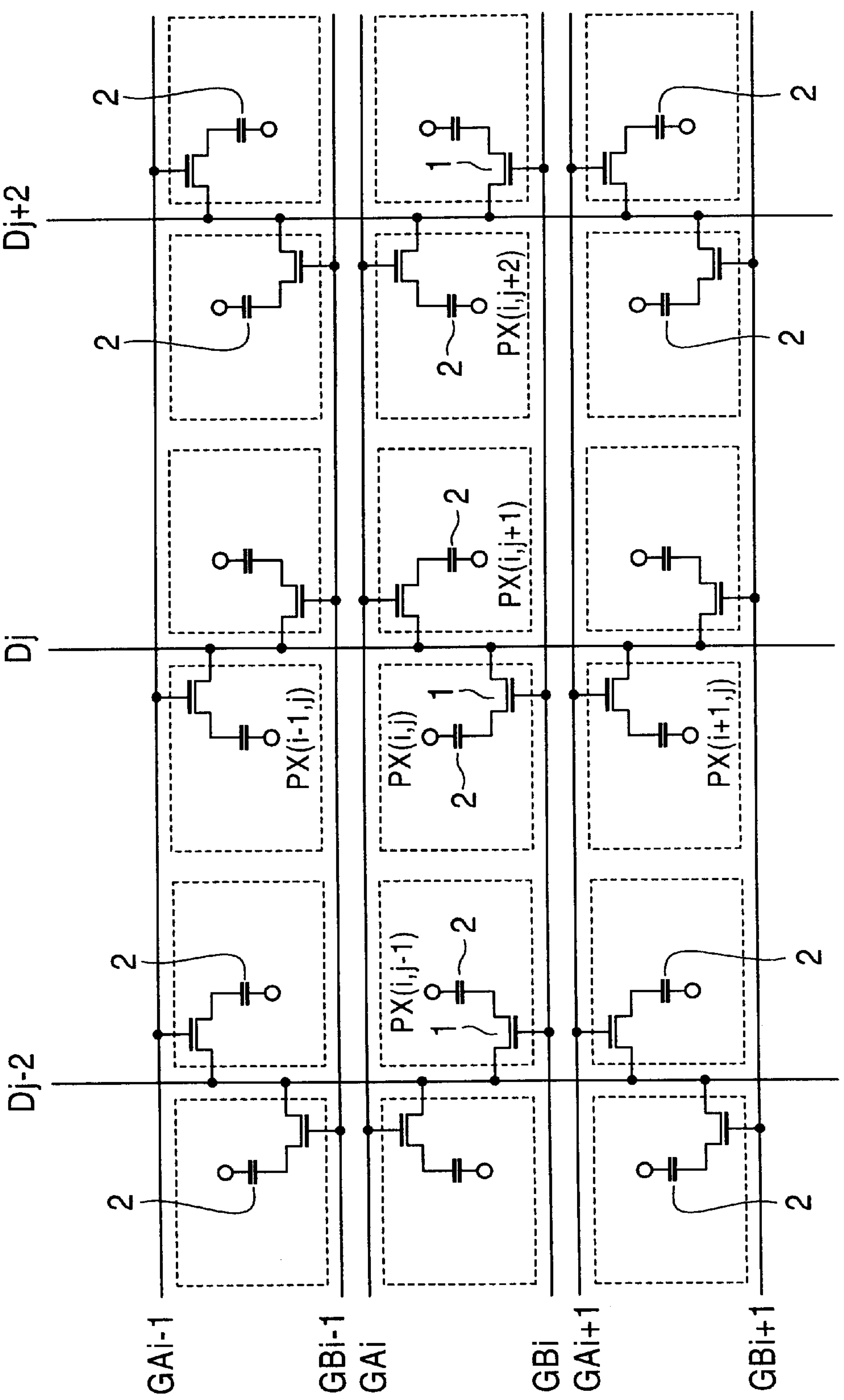
FIG. 1 is a plan view illustrating the construction of a first embodiment according to the present invention, an active matrix type liquid crystal display device substrate.

FIG. 1 is a plan view illustrating the construction of a first embodiment according to the present invention, an active matrix type liquid crystal display device substrate. As with FIG. 22, the rectangles of broken lines each represent individual pixels making up the pixel matrix PX (i, j) (wherein i=1 to m and j=1 to n).

Figure 22:
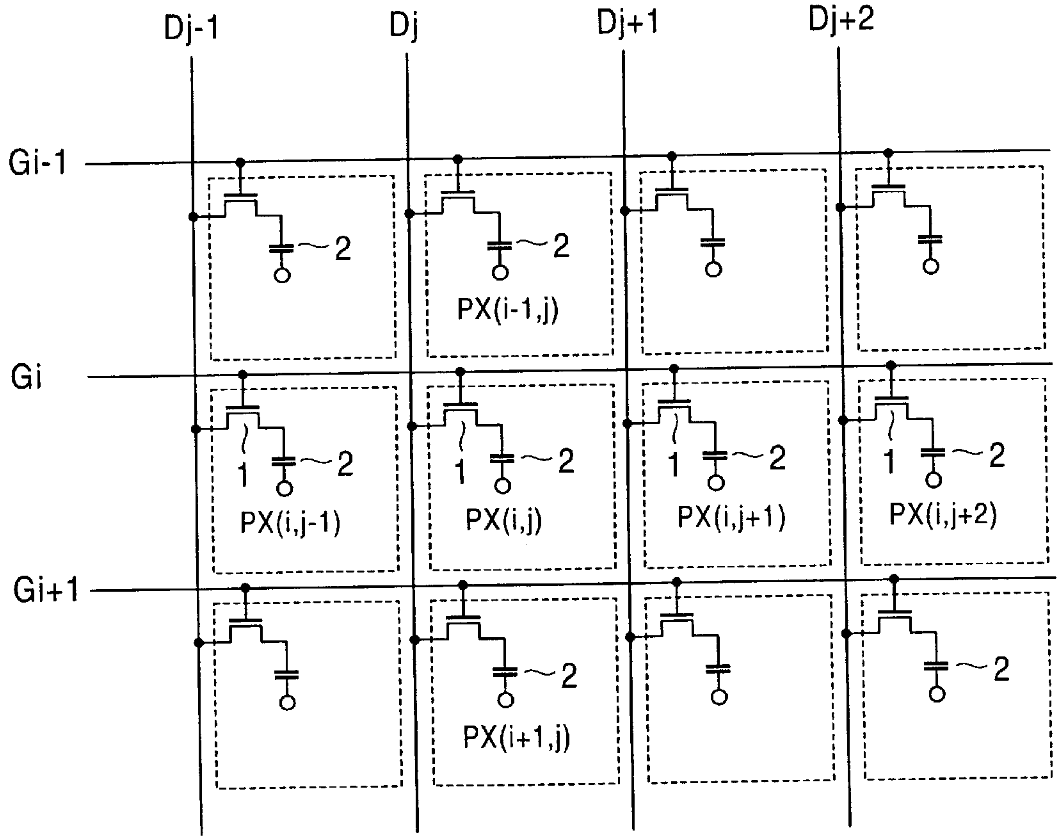
FIG. 22 PRIOR ART
FIG. 22 is a plan view illustrating the configuration of a known active matrix type liquid crystal display device.
Figure 23:
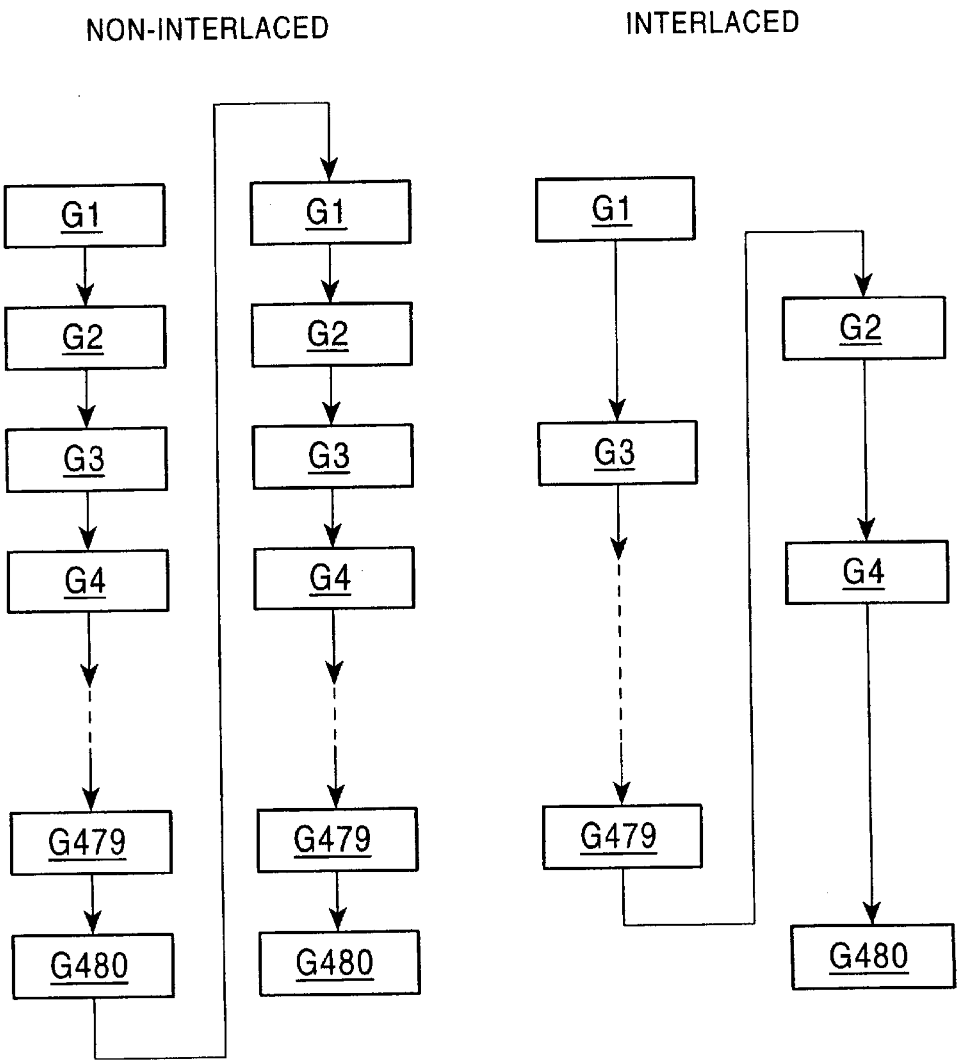
FIG. 23 is a diagram illustrating the gate line scanning procedures for an active matrix type liquid crystal display device.
Figure 24:
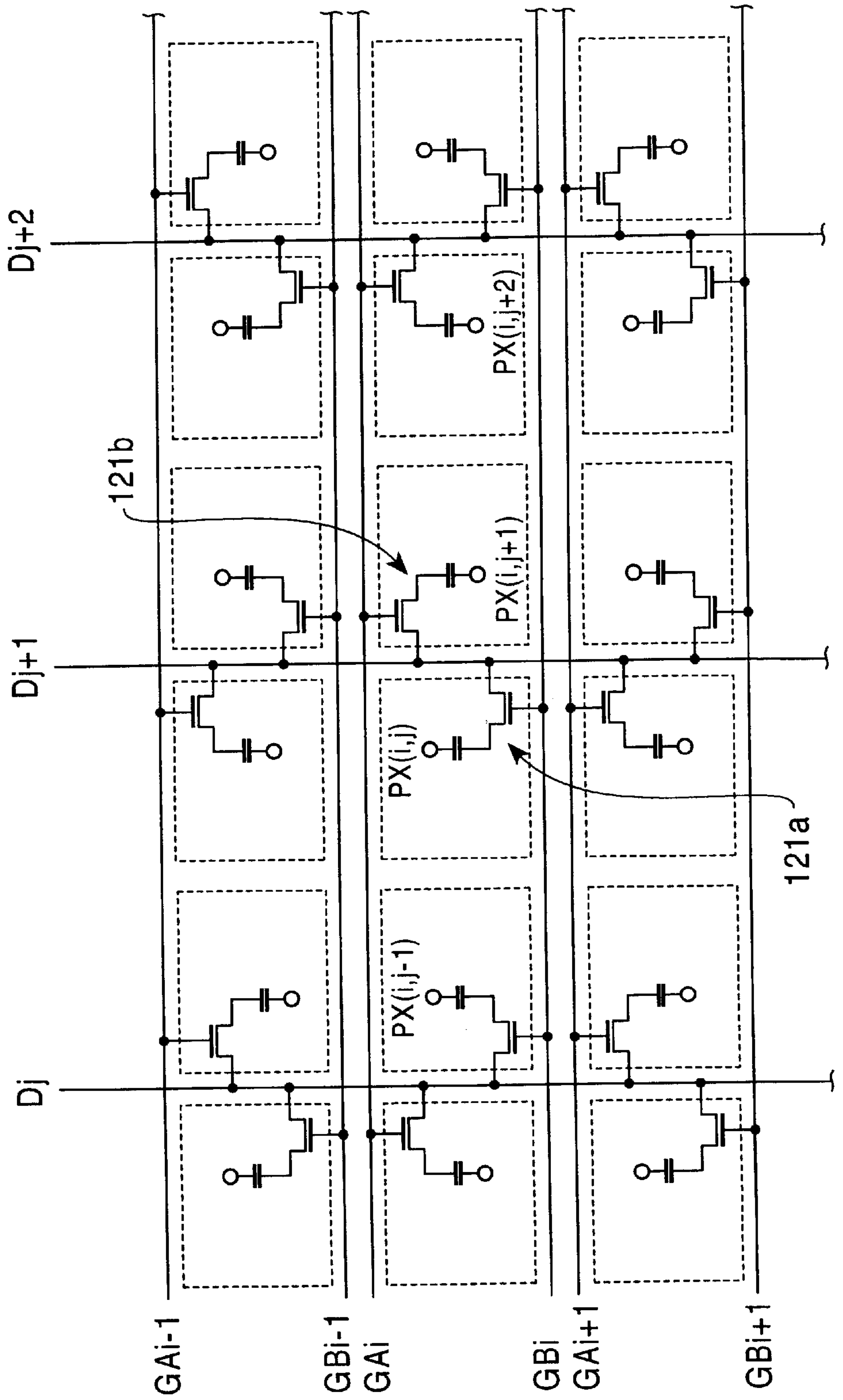
FIG. 24 is a diagram illustrating the equivalent circuit of a matrix substrate with the double-scanning method.
Figure 25A:
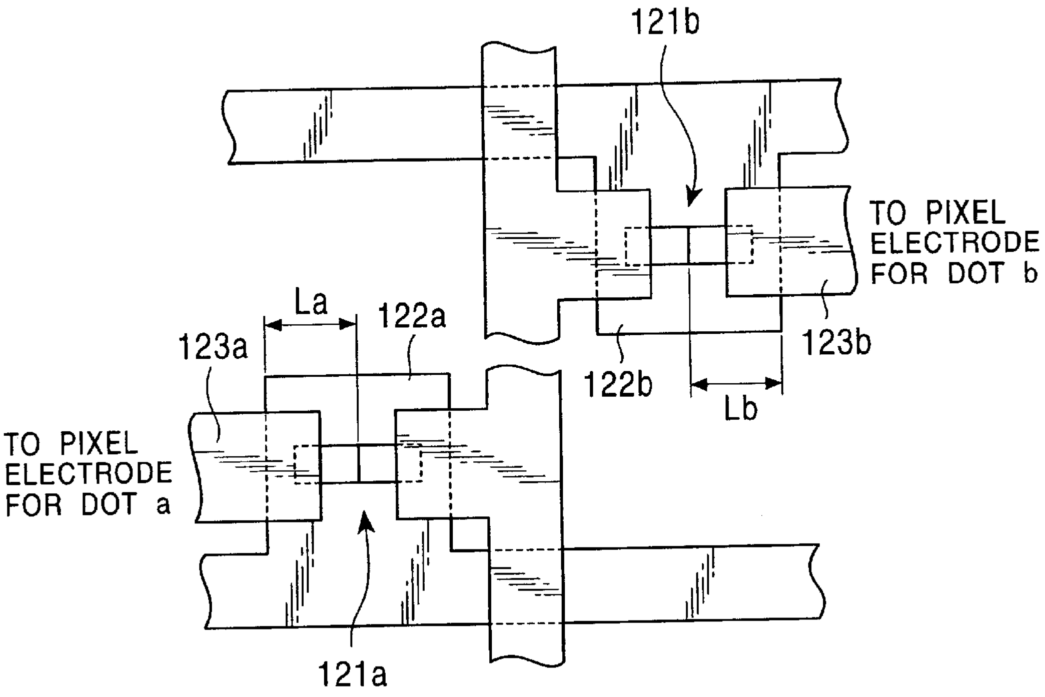
FIG. 25 is a diagram for describing the problems of the present invention.
Figure 25B:
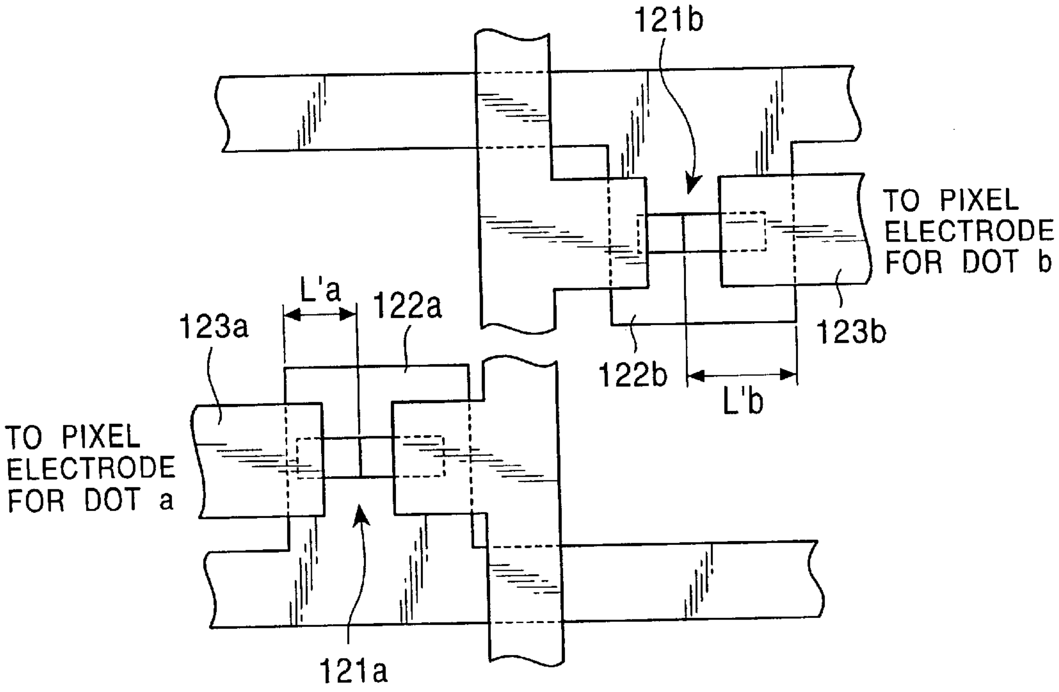

The arrangement of the active matrix type liquid crystal display device shown in FIG. 22 involved one data line Dj for each column of the pixel matrix PX (i, j) (i=1 to m and j=1 to n), and a gate line Gi for each row.

In comparison, the active matrix type liquid crystal display device according to the present embodiment shown in FIG. 1 consists of n/2 data lines arranged so as to couple off the columns of the pixel matrix PX (i, j) (i=1 to m and j=1 to n), with each data line being connected to the source electrodes of TFTs 1 of a number "2 m" of pixels on either side thereof. FIG. 1 shows three of these data lines, i.e., Dj−2, Dj, and Dj+2.

Also, regarding the rows of the pixel matrix PX (i, j) (i=1 to m and j=1 to n), a first gate line GAi (i=1 to m) and a second gate line GBi (i=1 to m) are formed on either side of an n number of pixels comprising each row. The n number of pixels comprising each row are coupled off by the above n/2 data lines, so there are two pixels between each data line, but the first and second gate lines alternately handle between the data lines, so as to supply gate voltage to the TFTs 1 of the two pixels between the data lines. Also, the first and second gate lines provided to each row handle between differing data lines between the neighboring rows, and supply gate voltage to the TFTs 1 between the data lines.

For example, looking at row i, gate voltage is supplied to the two pixels PX (i, j−1) and PX (i, j) between the data lines Dj−2 and Dj, by the second gate line GBi, and next to this, gate voltage is supplied to the two pixels PX (i, j+1) and PX (i, j+2) between the data lines Dj and Dj+2, by the first gate line GAi.

In the same way, looking at row i−1 which neighbors line i, gate voltage is supplied to the two pixels between the data lines Dj−2 and Dj, by the first gate line GAi−1, and next to this, gate voltage is supplied to the two pixels between the data lines Dj and Dj+2, by the second gate line GBi−1. This is the same for line i+1, as well.

Next, the specific configuration of the TFTs in the active matrix type liquid crystal display device substrate according to the present embodiment.

Figure 2:
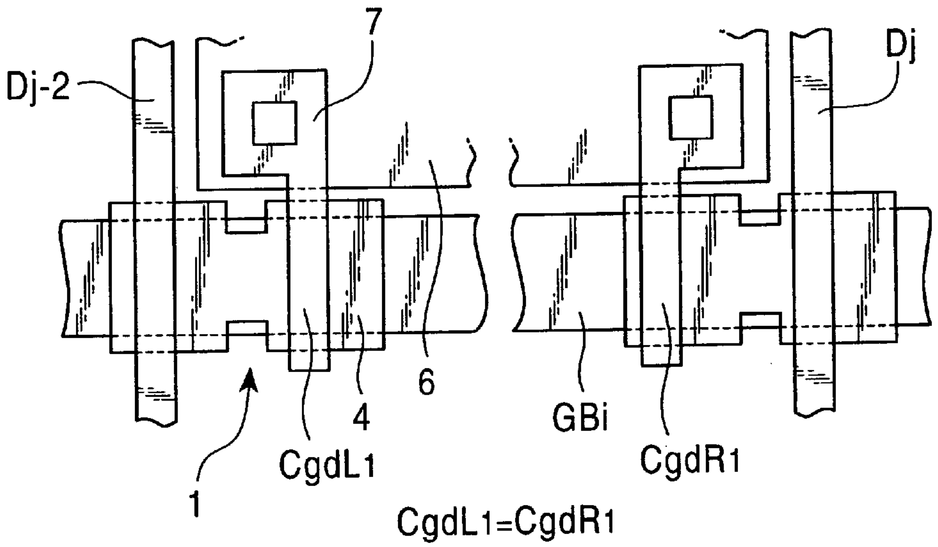
FIG. 2 is a plan view of the TFT portion of this substrate (in the case of a large island construction)
Figure 3:
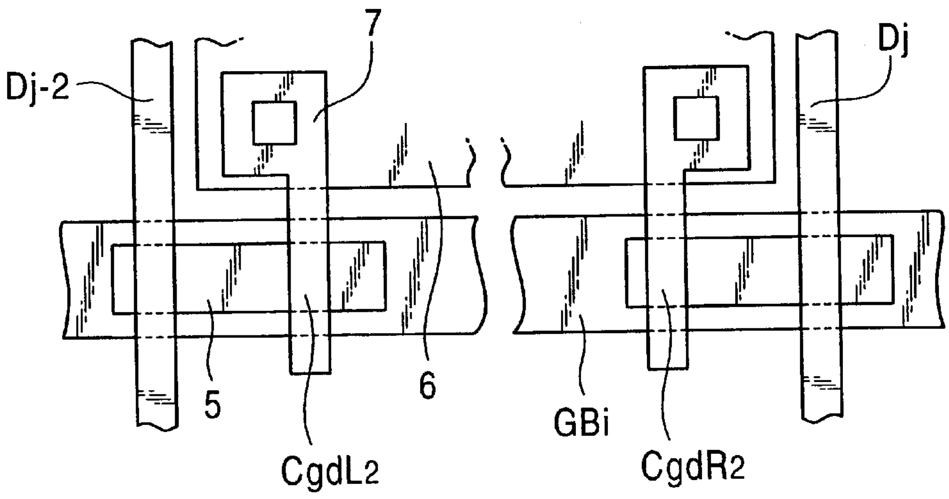
FIG. 3 is a plan view of the TFT portion of this substrate (in the case of a large gate construction)

FIG. 2 and FIG. 3 illustrate the TFT portion of the two pixels PX (i, j−1) and PX (i, j) surrounded by the data lines Dj−2 and Dj, and the first gate line GAi and second gate line GBi, shown in FIG. 1. FIG. 2 illustrates a case wherein the so-called large island construction is used wherein the width of the island 4 is greater than the width of the gate line GBi, and FIG. 3 illustrates a case wherein the so-called large gate construction is used, wherein the width of the gate line GBi is greater than the width of the island 5.

Now, the characterizing point of the TFT 1 according to the present embodiment is common to both FIG. 2 and FIG. 3, and is thus: the gate electrode comprising the TFT 1 is configured of the gate line GBi itself, and the drain electrode 7 electrically connected to the pixel electrode 6 traverses the gate line GBi.

Incidentally, the expression "reach data line being connected to the source electrodes of TFTs 1" was made in the above description, since FIG. 1 shows an equivalent circuit; however, in the actual configuration, the data lines Dj−2 and Dj themselves are the electrodes for the TFT 1, as shown in FIGS. 2 and 3.

Figure 4A:
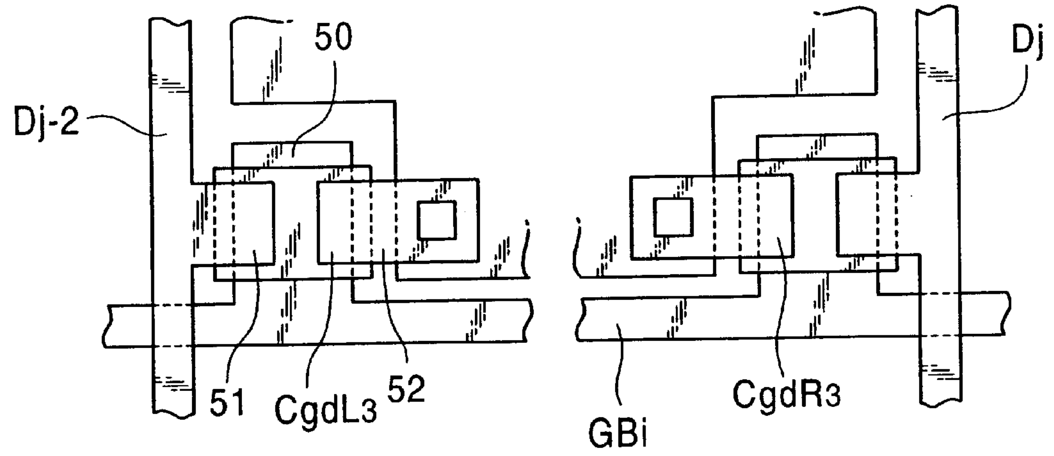
FIG. 4 is a plan view illustrating the configuration in the case that a known construction is used for the TFT portion of the substrate.
Figure 4B:
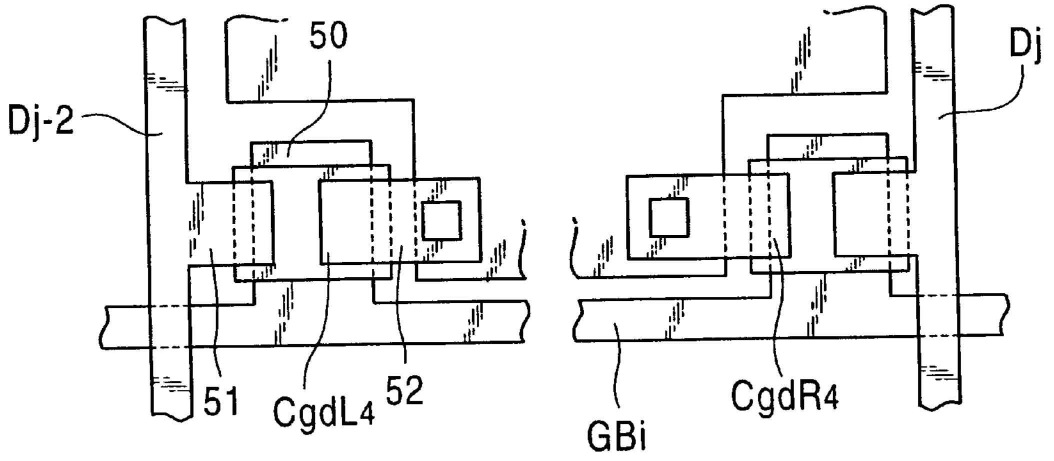

Conversely, FIGS. 4A and 4B show arrangement wherein a known common TFT structure is employed in the same place as above. That is, the gate electrode 50 protrudes from the gate line GBi, and the source electrode 51 and drain electrode 52 extend toward the center of the gate electrode 50.

In an arrangement wherein this configuration is employed, the gate-drain parasitic capacities CgdL3 and CgdR3 are both equal in the event that there is no shifting in the positioning of the gate layer and the source-drain layer as shown in FIG. 4A, but in the event that there is shifting in the position of the source-drain layer toward the left as to the gate layer as shown in FIG. 4B, the CgdL4 of the TFT to the left becomes greater than normal, and the CgdR4 of the TFT to the right becomes smaller. Accordingly, the field-through voltage ΔVp of the right pixel and the left pixel come to differ, thereby generating flickering and brightness irregularities on the liquid crystal screen.

On the other hand, in an arrangement wherein the configuration according to the present embodiment shown in FIGS. 2 and 3 is employed, the drain electrode 7 which connects to the pixel electrode 6 traverses the gate electrode (gate line GBi), so even in the event that there is shifting in the positioning thereof, the gate-drain parasitic capacities CgdL1 and CgdR1, and CgdL2 and CgdR2 of the right and left TFTs are respectively equal, and the field-through voltage ΔVp is also equal, so flickering and brightness irregularities can be suppressed. Though FIGS. 2 and 3 show a case in which the source-drain layer has shifted to the left in comparison to the gate layer, but the CgdL and CgdR of the right and left TFTs are the same event in cases wherein the source-drain layer shifts to the right or rotates in comparison to the gate layer, etc., thereby obtaining the same advantages.

Next, the operation of the present embodiment will be described.

With the present embodiment, two field cycles are used for image display of one screen, by interlaced scanning wherein first and second gate lines are alternately scanned at respective filed cycles. That is, in the odd field cycle, for example, gate voltage is sequentially applied at certain time periods to each of the first gate lines GAi (i=1 to m). Also, during the period in which gate voltage is being applied to each of the gate lines, signal voltage is output to each of the n/2 pixels connected to the gate lines via the n/2 data lines. That is, in the example shown in FIG. 1, during the period wherein gate voltage is being applied to the gate line GAi, signal voltage is supplied to the pixels PX (i, j−2), PX (i, j+1), and PX (i, j+2), connected to the gate line GAi via the data lines Dj−2, Dj, and Dj+2. As a result, in the odd field cycle, signal voltage is written to half of the pixels connected to the gate line GA (i) (wherein i=1 to n) out of the pixels in the m rows and n columns.

Then, in the even field cycle, gate voltage is sequentially applied at certain time periods to each of the second gate lines GBi (i=1 to m). Also, during the period in which gate voltage is being applied to each of the gate lines, signal voltage is output to each of the n/2 pixels connected to the gate lines via the n/2 data lines. As a result, in the even field cycle, signal voltage is written to the other half of the pixels connected to the gate line GB (i) (i=1 to n).

Thus, according to the present embodiment, the signal voltage for one screen is written to all of the m rows and n columns of pixels over two field cycles, thereby displaying the image for one screen in a complete form.

The above is a description of the configuration and operation of the present embodiment, of which the advantages can be listed as follows.

(1) The number of data lines can be reduced to half of that of known arrangements. Accordingly, the number of data drivers can be reduced, thereby reducing the cost of the overall device. For example, in the case of a VGA liquid crystal panel configuration, with the number of pixels in the column direction of 1,920 and the number of pixels in the row direction of 480, only 960 data lines are necessary. Accordingly, only four data drivers with 240 output terminals need to be provided in the column direction, thereby reducing the number of data drivers to half, and facilitating reduction in price of the device. Incidentally, with the present embodiment, the number of gate lines in a VGA liquid crystal display panel are 960, which requires the use of four gate drivers (two in known arrangements). However, the number of expensive data drivers is cut in half, and the overall number of parts is reduced, so consequently, the overall cost of the device is lowered.

(2) The number of data lines is only half of known arrangements, so even in cases of constructing a liquid crystal display panel with a small display area, the requirement to narrow the pitch in the data wiring terminal portion is not severely demanding.

(3) With the above-described known active matrix type liquid crystal display device, n data lines are driven in each field cycle, but with the present embodiment, only n/2 data lines are driven in each field cycle. Accordingly, with the present embodiment, the driving frequency of each data driver can be lowered to half. Also, the number of data drivers is half of known arrangements, as described above. Accordingly, the total electrical power consumption of all of the data drivers is lowered to ¼ of known arrangements. Incidentally, with the present embodiment, the number of gate lines is doubled compared with known arrangements, so the number of gate drivers needed also increases. However, the driving frequency of gate drivers is extremely small in comparison with that of data drivers, so the increase in overall electrical consumption owing to the increase in the number of gate drivers is minute, so consequently, the overall electrical consumption of the device is greatly reduced.

(4) With the present embodiment, the sections divided by the n/2 data lines are alternately handled by the first and second gate lines, so as to supply gate voltage to the pixels within each section, and at neighboring rows, the first and second gate lines handle different sections, so display is made by n/2 pixels in all rows regardless of whether the field cycle is odd or even, and also, display is made by m/2 pixels in all columns. Thus, the present embodiment is advantageous in that line crawling, wherein unsightly vertical streaks or horizontal streaks show up on the screen, does not easily occur.

(5) With the present embodiment, the configuration is such that the drain electrodes connected to the pixel electrodes traverse the gate lines GBi in the plane construction of the TFTs, so even in the event that there is positioning shift between the gate layer and the source-drain layer, the Cgd of the right and left TFTs is equal, and the field-through voltage ΔVp is also equal, thereby suppressing flickering and brightness irregularities.

Second Through Fourth Embodiments

Figure 5:
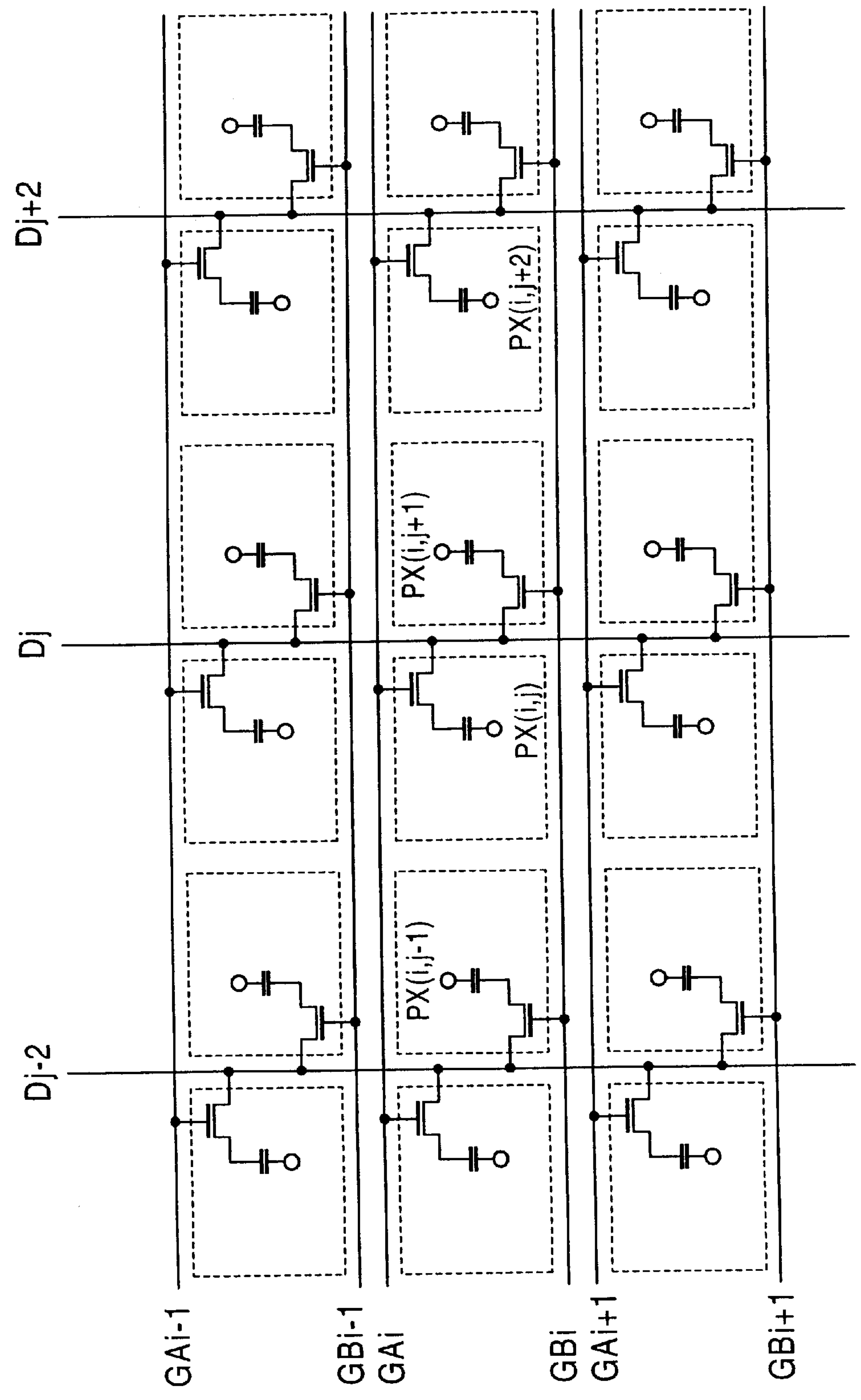
FIG. 5 is a plan view illustrating the construction of a second embodiment according to the present invention, an active matrix type liquid crystal display device substrate.
Figure 6:
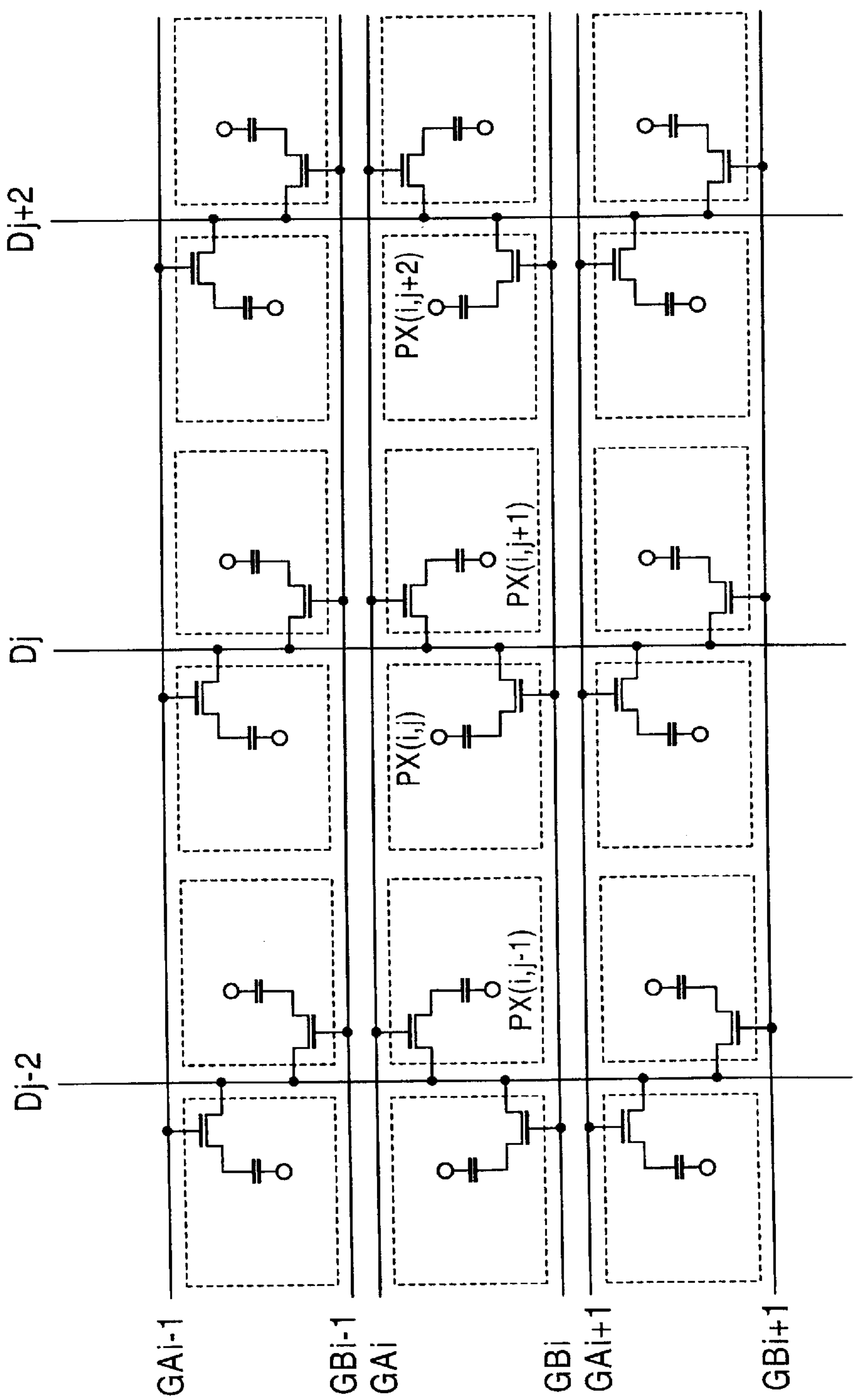
FIG. 6 is a plan view illustrating the construction of a third embodiment according to the present invention, an active matrix type liquid crystal display device substrate.
Figure 7:
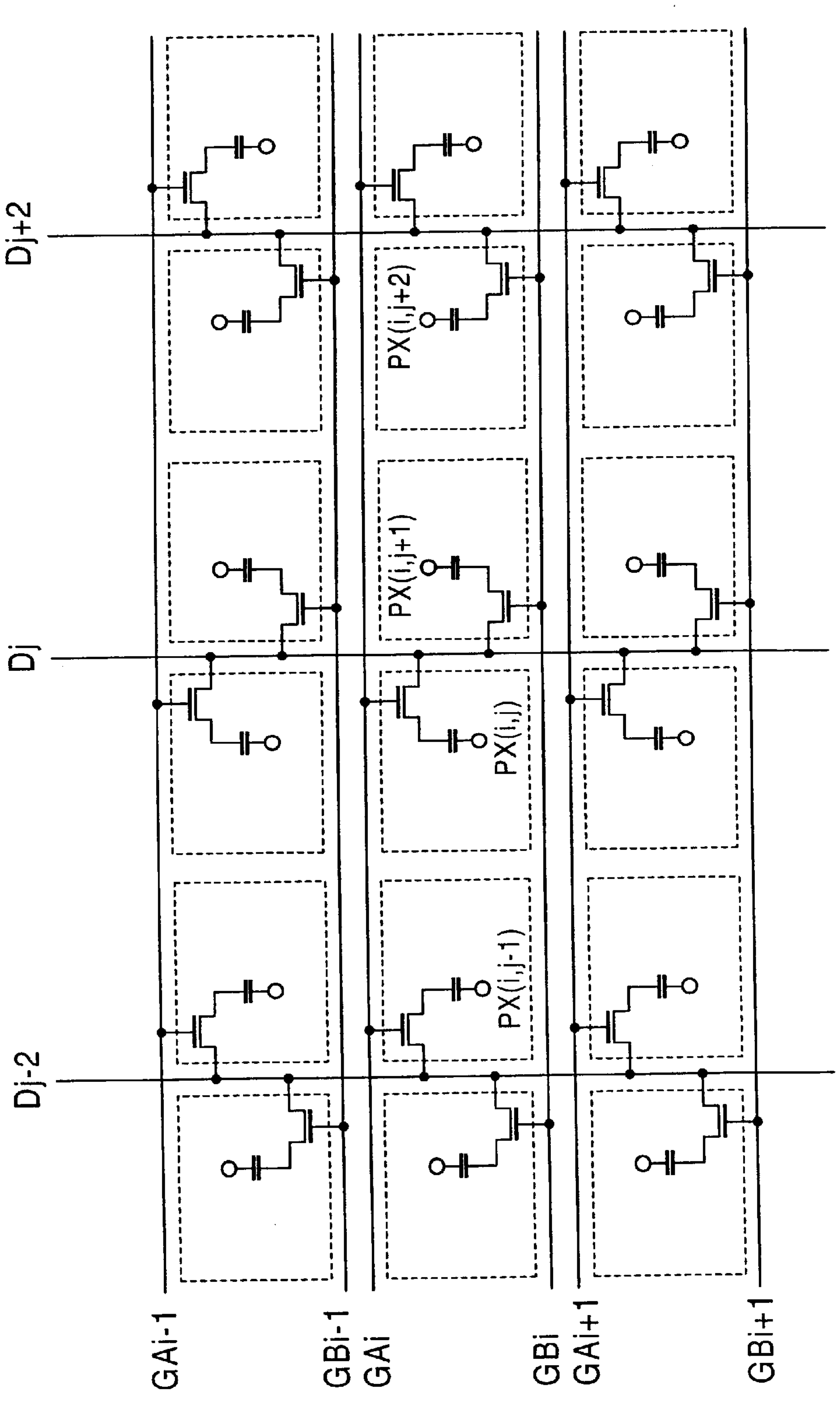
FIG. 7 is a plan view illustrating the construction of a fourth embodiment according to the present invention, an active matrix type liquid crystal display device substrate.

FIGS. 5 through 7 each illustrate the second through fourth embodiments according to the present invention. Though the specific connection relation between the gates and the pixels in these embodiments differs from that shown for the first embodiment, each of these embodiments is identical to the first embodiment regarding the point that n/2 data lines each handle two columns apiece and supply signal voltage, and regarding the point that first and second gate lines handle n/2 pixels apiece for each row to supply gate voltage. Each of these embodiments have been shown as specific examples of variations of the first embodiment, in order to clearly show that the connection relation between the gate lines and pixels in the present invention is not restricted to the first embodiment, and that many types of variations can be made. These embodiments also exhibit the advantages (1) through (3) listed above in conjunction with the first embodiment. Incidentally, regarding prevention of line crawling, the above first embodiment and third embodiment (FIG. 6) are best, with the second embodiment (FIG. 5) and fourth embodiment (FIG. 7) having problems in that vertical streaks appear more readily than with the others.

Figure 8:
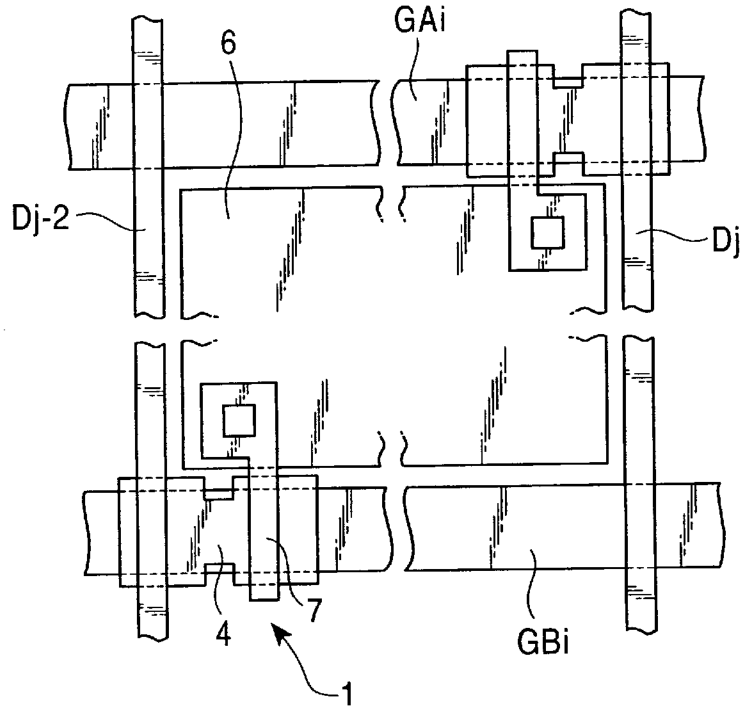
FIG. 8 is a plan view of the TFT portion of the substrate according to the second or third embodiment (in the case of a large island construction)
Figure 9:
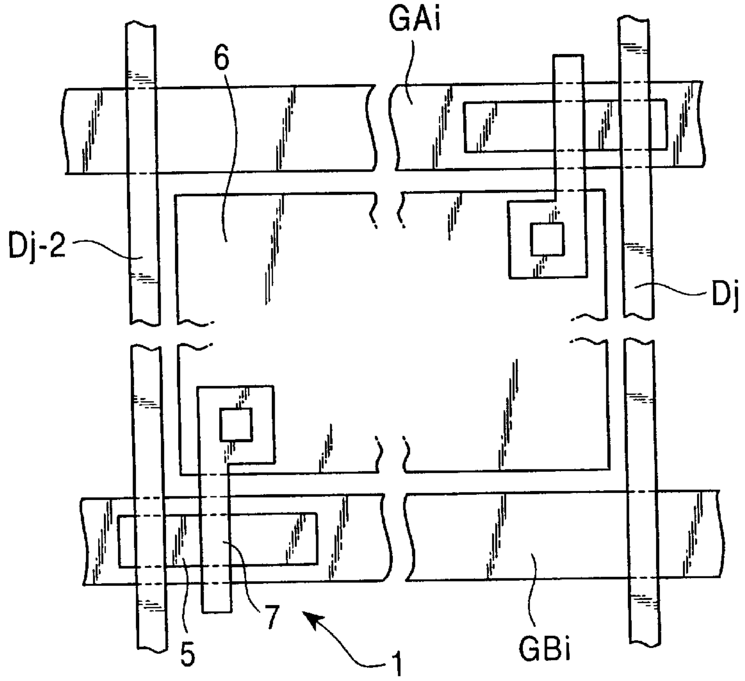
FIG. 9 is a plan view of the TFT portion of the substrate according to the second or third embodiment (in the case of a large gate construction)

FIG. 8 and FIG. 9 show specific configurations of TFTs corresponding with the equivalent circuits shown in FIGS. 5 and 6. FIG. 8 shows a case wherein a large island structure has been employed, and FIG. 9 shows a case wherein a large gate structure has been employed.

As shown in these Figures, the configuration of the present embodiment is such that the drain electrodes 7 connecting to the pixel electrodes 6 traverse the gate lines GAi and GBi, as with the first embodiment, so even in the event that there is position shifting between the gate layer and the source-drain layer, the Cgd of the right and left TFTs is equal, and the field-through voltage ΔVp is also equal, thereby suppressing flickering and brightness irregularities. In other words, the advantage (5) listed for the above first embodiment can be obtained.

Fifth Embodiment

In order to raise contrast, reduce cross-talk, and improve image quality, raising the capability of each pixel to hold signal voltage is effective. To this end, a configuration wherein storing capacity is connected to each pixel electrode is often employed with active matrix type liquid crystal display devices.

Figure 10:
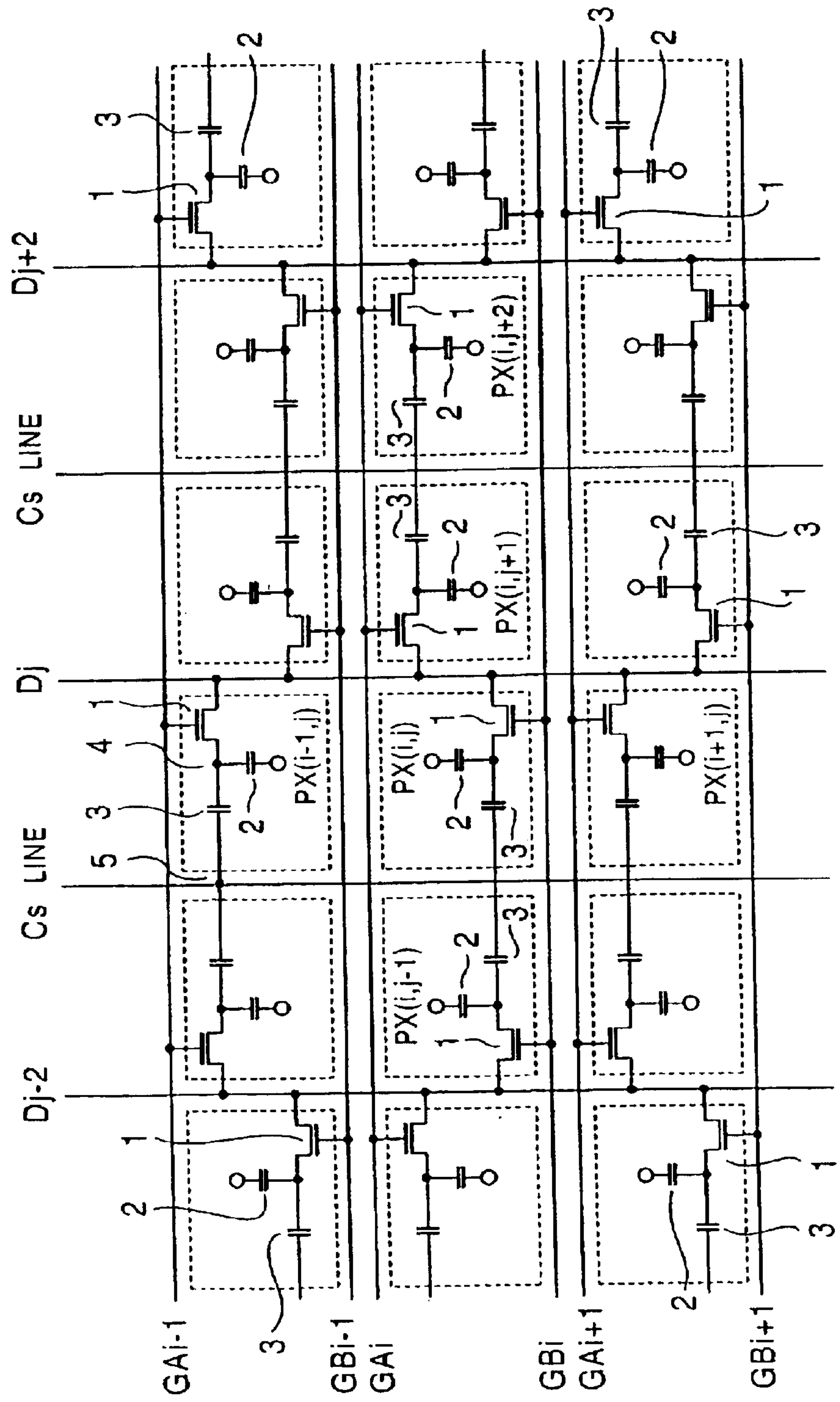
FIG. 10 is a plan view illustrating the construction of a fifth embodiment according to the present invention, an active matrix type liquid crystal display device substrate.

The present embodiment is an improvement on the above first embodiment, in that storing capacity is connected to each pixel electrode. The configuration of the present embodiment is shown in FIG. 10. As shown in the Figure, each pixel PX (i, j) (wherein i=1 to m and j=1 to n) has formed thereto a storing capacity 3, and one of the electrodes 4 of the storing capacity 3 is connected to the pixel electrode (i.e., one of the electrodes of the liquid crystal capacity 2) for each pixel. Also, the pixels PX (i, j) (i=1 to m and j=1 to n) are coupled into two columns apiece by n/2 data lines (FIG. 1 shows three of these data lines, i.e., Dj−2, Dj, and Dj+2), with Cs lines (storing capacity lines) being formed parallel with the data lines at the border area between the pixels at which these data lines at the border area between the pixels at which these data lines have not been formed. The other electrodes 5 of the storing capacity 3 for the pixels are connected to an unshown reference power source via these Cs lines.

According to the present embodiment, the capability of each pixel to hold signal voltage is raised by the storing capacity 3 thus connected to each pixel electrode, so advantages such as raised contrast and reduced cross-talk can be obtained. Also, according to the present embodiment, the configuration is such that one Cs line is shared for two pixel columns, so even in the event that the number of gate lines doubles, there is no reduction in aperture ratio. In order to confirm the advantages in the event that the construction according to the present embodiment is applied to a known active matrix type liquid crystal display device, the Inventor has tested layout design of an construction according to the present embodiment without changing the design rules. The results yielded an aperture ratio similar to that of known arrangements.

Now, connecting the storing capacity 3 to the pixel electrodes as in the present embodiment causes writing current to flow through the Cs lines at the time of writing signal voltage. Accordingly, in the event that the wiring resistance of the Cs lines is high, insufficient writing may occur as a consequence of the wiring resistance. Means that might be conceived for preventing such trouble include increasing the width of the Cs lines so as to lower the wiring resistance, but this leads to lowering of the aperture ratio, which is undesirable.

Accordingly, the present invention takes advantage of the characteristics of the first embodiment, in that two pixels worth of writing data flow through the Cs lines at all times, and provides means for lowering the voltage drop of the Cs wiring by offsetting the writing current. More specifically, according to the present embodiment, at the time that an unshown data driver applies signal voltage to each of n/2 data lines, the signal voltage is output so that signal voltage with reverse polarity is always applied to the two neighboring data lines. That is to say, in the event that gate voltage is applied to gate line GBi in a certain field cycle for example, positive signal voltage is applied to the data line Dj−2 for example, and negative signal voltage is applied to the neighboring data line Dj. As a result of such application of signal voltage with reverse polarity, writing currents corresponding with these signal voltages flow through the data lines Dj−2 and Dj, so the writing currents offset one another. Consequently, only a minute current flows through the Cs line, so there is no problem of insufficient writing.

The above has been description of an example wherein storing capacity and Cs lines are added to the first embodiment (FIG. 1), but storing capacity and Cs lines may be added to the fourth embodiment (FIG. 7), as well. This fourth embodiment is also configured such that writing current flows to the two pixels sandwiched between two data lines, as with the first embodiment, so in the event that the same configuration as the present embodiment (fifth embodiment) is employed, writing current can be offset in the Cs lines.

Sixth Embodiment

Figure 11:
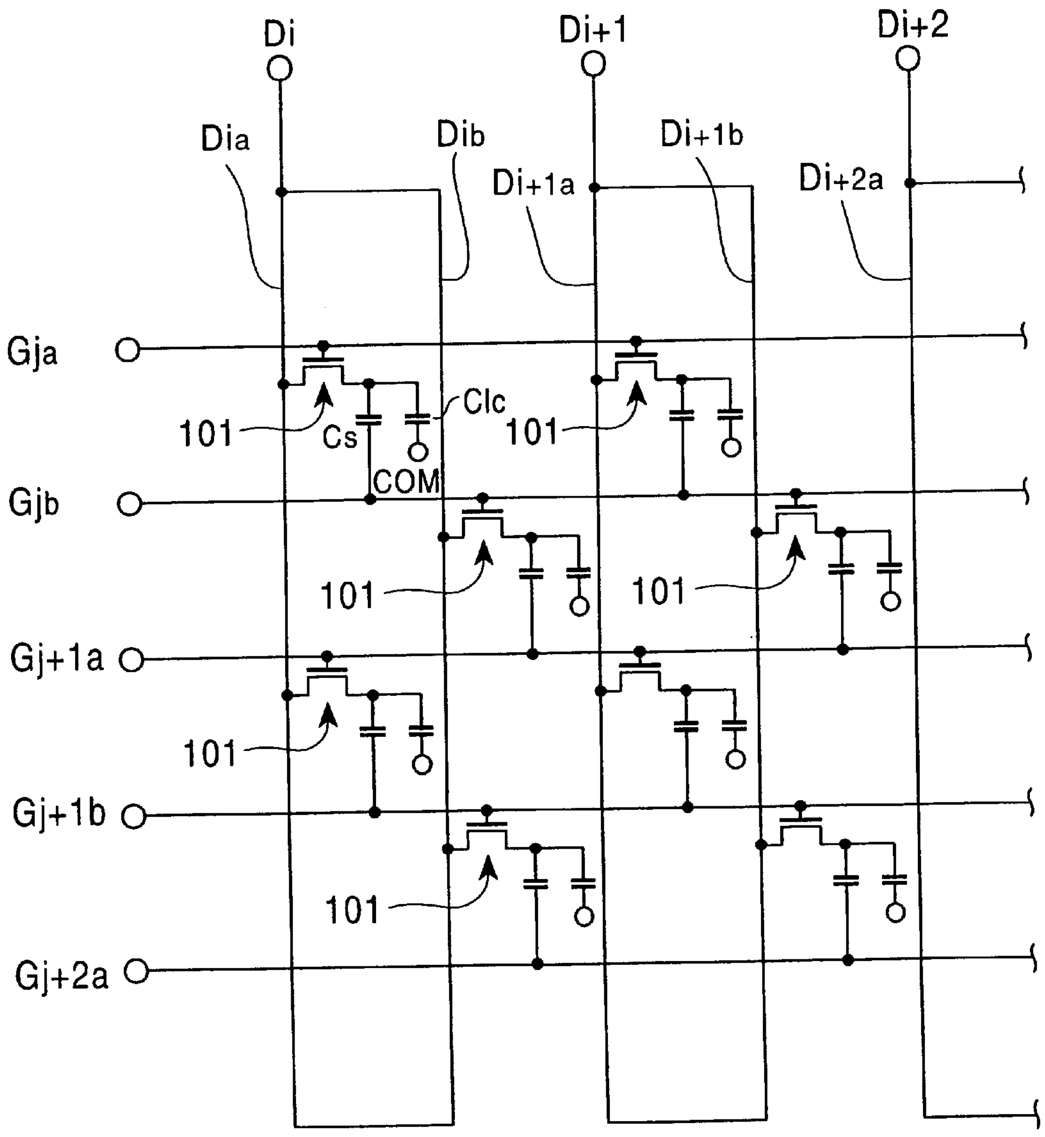
FIG. 11 is a diagram illustrating the construction of a sixth embodiment according to the present invention, an equivalent circuit of the matrix substrate.
Figure 12:
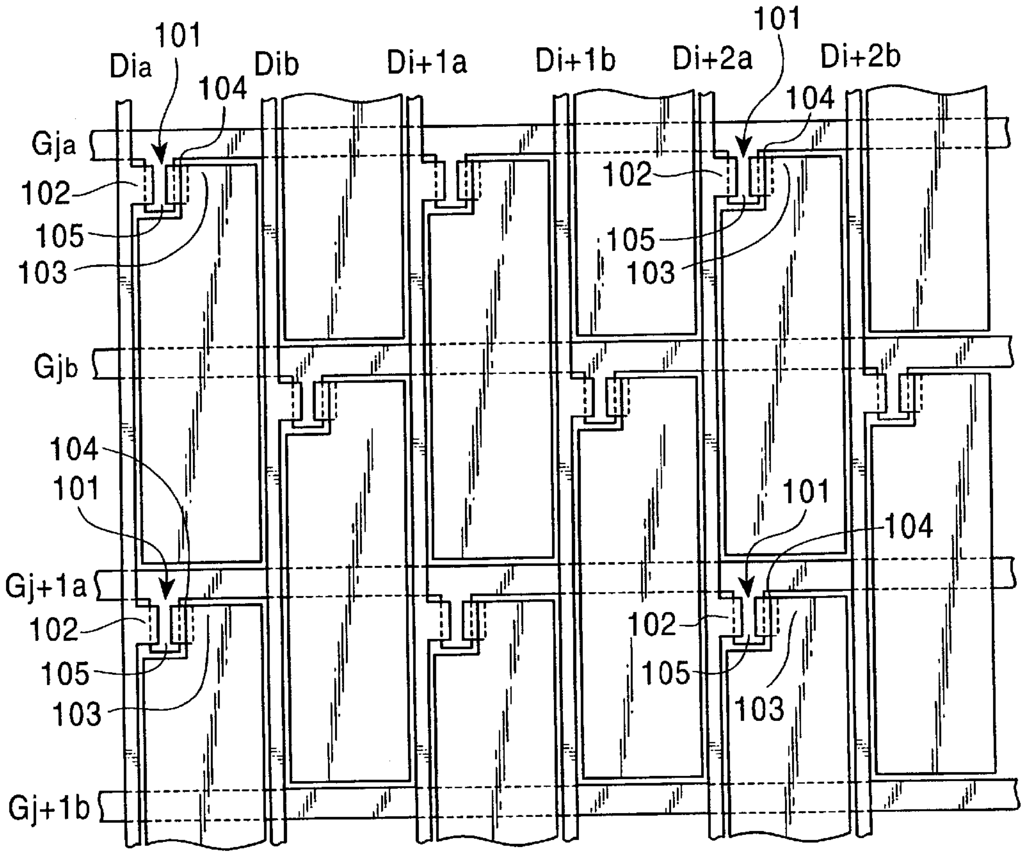
FIG. 12 is a plan view illustrating the layout of this matrix substrate.

The following is a description of a sixth embodiment of the present invention, with reference to FIGS. 11 and 12.

FIG. 11 is a diagram illustrating the construction of the equivalent circuit of the active matrix type liquid crystal display device substrate in the liquid crystal display device according to the present invention, and FIG. 12 is an actual design layout diagram.

As shown in FIGS. 11 and 12, a plurality of data lines Dia, Dib, and so forth, and a plurality of gate lines Gja, Gjb, and so forth, are provided in matrix fashion on a substrate, and TFTs 101 are provided to the same side as the data lines Dia, Dib, and so forth (to the right in the drawing). Accordingly, the TFTs 101 are in a positional relation of parallel movement, such that the source electrodes 102 to be connected to the data lines Dia, Dib, and so forth are to the left for all of the TFTS on the substrate, and the drain electrodes 104 to be connected to the pixel electrodes 103 are to the right. The pixel electrodes 103 and the common electrode facing the pixel electrodes 103 across the liquid crystal together comprise the liquid crystal capacity Clc.

With the present embodiment, as shown in FIG. 11, the neighboring data lines Dia, Dib, Di+1a, Di+1b, and so forth are connected at both ends two each, and one side to be connected to the data driver extends as a single data line Di, Di+1, and so forth. Then, the gate electrodes 105 of the TFTs 101 corresponding with the mutually connected two-line sets of data lines Di are connected to differing gate lines Gja, Gjb, and so forth. Also, in the same manner, the gate electrodes of the TFTs 101 corresponding to the neighboring two-line sets of data lines Di+1 are connected to the repeatingly different gate lines Gja, Gjb, and so forth. Each gate line is positioned at equal spacing, and as shown in FIG. 12, the gate line Gjb connected to the TFT 101 of the neighboring dot traverses the center of the pixel electrode 103 of the dot surrounded by the data lines Dia, Dib, gate lines Gja, and Gj+1a, but this portion has as structure wherein the pixel electrode 103 and the gate line Gjb are layered with an insulating layer therebetween, thus comprising a storing capacity Cs.

Two-field one-frame interlacing driving is sued for driving the liquid crystal display device of the above configuration. That is to say, the two neighboring data lines Dia and Dib are electrically connected, so the same image signals are supplied to the two data lines Dia and Dib. Then, in the first field, scanning signals are supplied to the gate lines Gja, Gj+1a, and so forth with the subscript "a", and thus these gate lines become active. In the second field, scanning signals are supplied to the gate lines Gjb, Gj+1b, and so forth with the subscript "b", and thus these gate lines become active. Accordingly, image signals are supplied from the data lines to the dots connected to the gate lines Gja, Gj+1a, and so forth with the subscript "a", and in the second field, image signals are supplied from the data lines to the dots connected to the gate lines Gjb, Gj+1b, and so forth with the subscript "b".

With the present embodiment, the number of gate lines is doubled as compared with known common active matrix type liquid crystal display device substrates, the number of data lines at the connection portion of the data driver is cut in half, so the number of expensive data drivers can be reduced, thereby reducing costs for the overall device. Moreover, the arrangement wherein the TFTs 101 on the active matrix type liquid crystal display device substrate are positioned in parallel movement rather than in point symmetry causes all TFTs on the substrate to shift in the same direction. Consequently, the gate-drain parasitic capacity becomes equal among the TFTs, and the offset voltage is uniform within the substrate, so flickering which degrades image quality can be suppressed.

Also, regarding the mutual connection of the data lines Dia and Dib, functionally, only one place at the side to be connected to the data driver needs to be connected, since the object is to reduce the number of data lines connected to the data driver. However, with the present embodiment, the neighboring two data lines Dia and Dib are connected at both ends. According to this configuration, even in the event that one of the two data lines Dia and Dib is broken in one place, image signals are supplied without interruption, via the normal data line side. That is to say, even in the event that one of the data lines is broken in one place, supply of image signals is not interrupted, thus preventing data line dropout. According to this construction, a redundant structure can be implemented regarding line dropout, thus improving yield.

Further, the gate lines Gja, Gjb, and so forth for controlling the TFTs 101 of neighboring dots traverse the center of dots, but the area wherein the gate lines traverse the dots can be used as storing capacity Cs, so there is no reduction in aperture ratio even if the gate lines do traverse the dots.

Seventh Embodiment

Now, the seventh embodiment of the present invention will be described with reference to FIG. 13 and FIG. 14.

Figure 13:
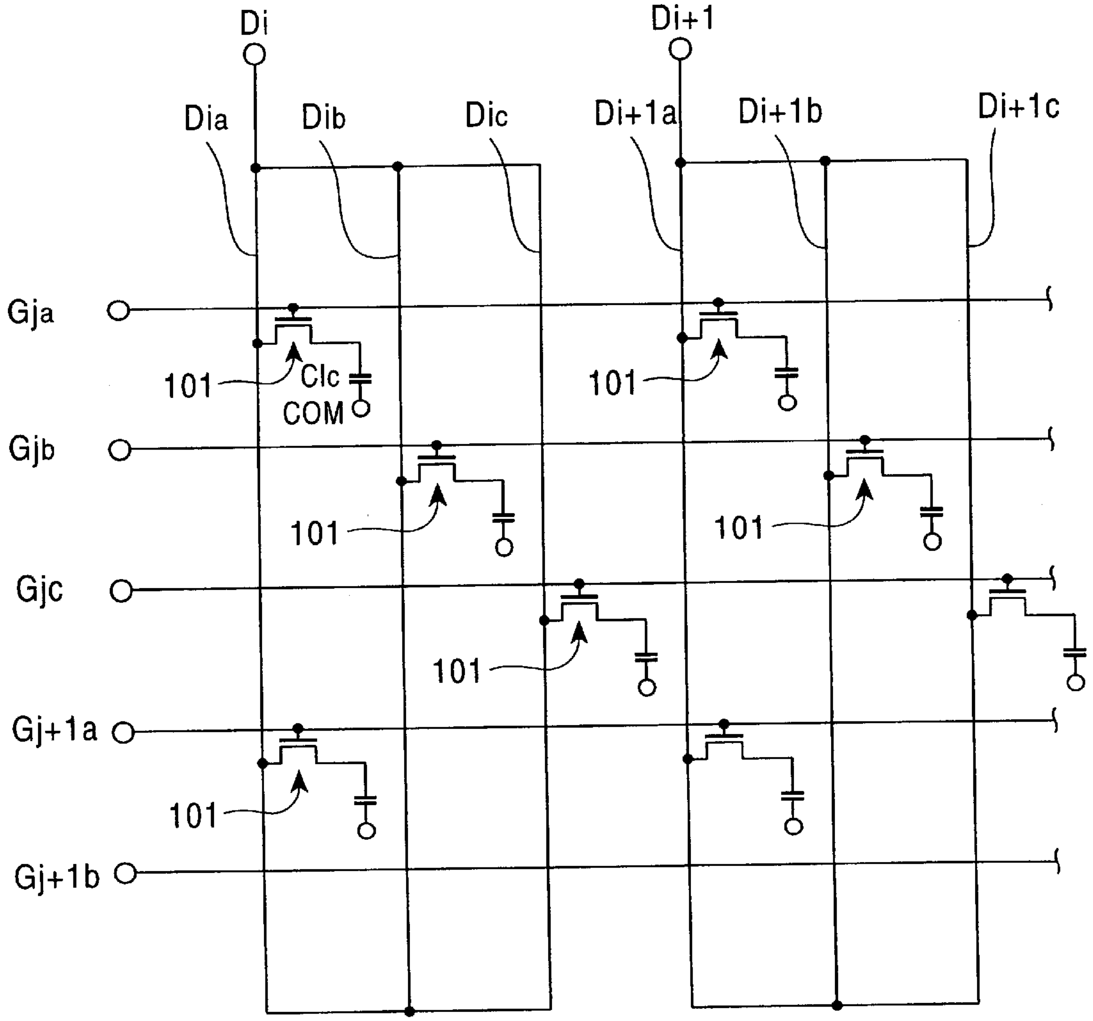
FIG. 13 is a diagram illustrating the construction of a seventh embodiment according to the present invention, an equivalent circuit of the matrix substrate.
Figure 14:
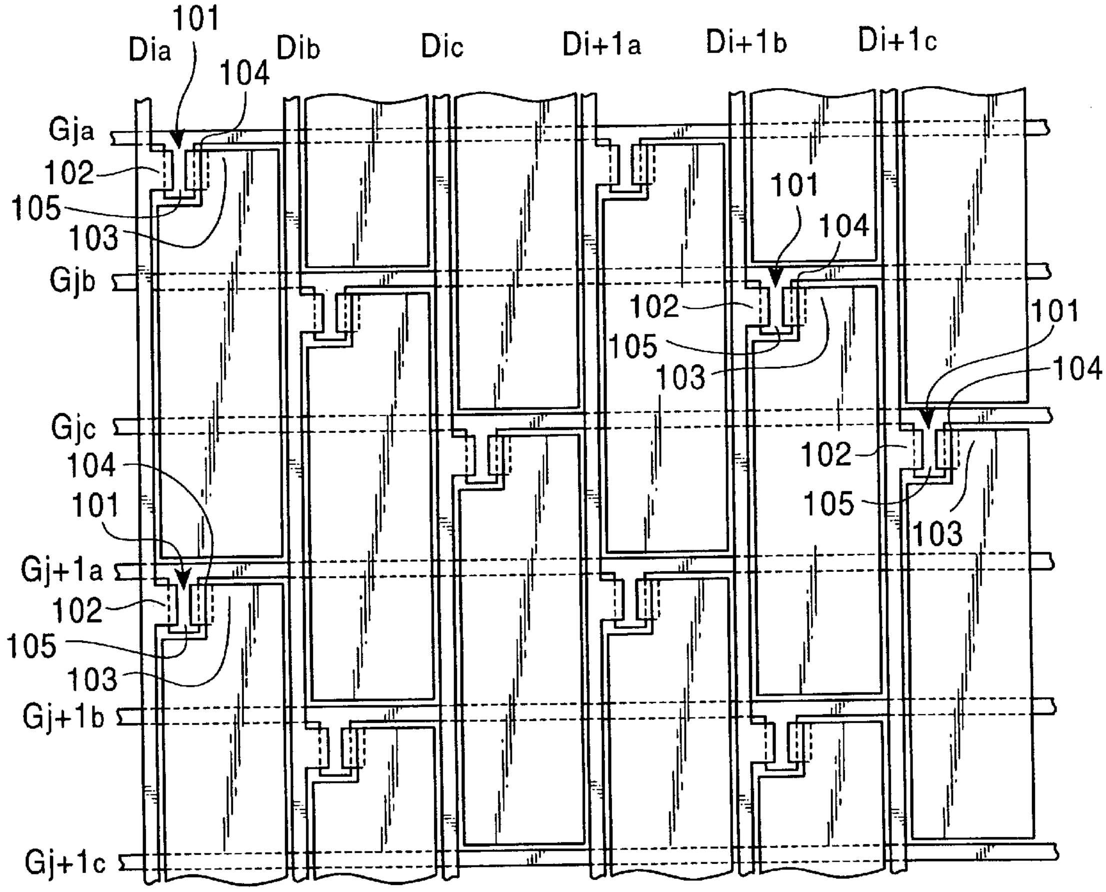
FIG. 14 is a plan view illustrating the layout of this matrix substrate.

FIG. 13 is a diagram illustrating an equivalent circuit of the active matrix type liquid crystal display device substrate, and FIG. 14 is a layout diagram. In FIG. 13, the storing capacity Cs has been omitted from the drawing for the sake of description.

As shown in FIGS. 13 and 14, the active matrix type liquid crystal display device substrate according to the present embodiment differs from the sixth embodiment in that data lines have been electrically connected in units of three.

In the present embodiment as well, the TFTs 101 are provided to the same side as the data lines Dia, Dib, Dic, Di+1a, Di+1b, Di+1c, and so forth (to the right in the drawing), and the positional relation of the source electrode 102 and drain electrode 104 is the same for all TFTs 101 on the substrate. Then, the neighboring data lines Dia, Dib, Dic, Di+1a, Di+1b, Di+1c, and so forth are connected at both ends in units of three. Also, the gate electrodes 105 of the TFTs 101 corresponding to the mutually connected three data lines Dia, Dib, and Dic are each connected to differing gate lines Gja, Gjb, Gjc, and so forth. As shown in FIG. 14, traversing the pixel electrode of a dot is the gate line connected to the TFT of the neighboring dot, and the gate line connected to the dot one removed, i.e., making two gate lines traversing the dot, thereby comprising storing capacity Cs at this portion.

Driving of this embodiment is also performed by interlacing, but unlike the sixth embodiment, three fields comprise one frame. That is to say, in the first field, the gate lines Gja, Gj+1a, and so forth become active and image signals are supplied from the data lines to the dots corresponding to these gate lines Gja, Gj+1a, and so forth with the subscript “a”; in the second field, image signals are supplied from the gate lines Gjb, Gj+1b, and so forth, to the dots corresponding to these gate lines with the subscript “b”; and in the third field, image signals are supplied from the gate lines Gjc, Gj+1c, and so forth, to the dots corresponding to these gate lines with the subscript “c”.

With the present embodiment, the number of data lines Dia, Di+1, and so forth at the connection portion with the data driver is ⅓ of that of a known common active matrix type liquid crystal display device substrate, thus facilitating reduction of the number of expensive data drivers. Also, with the present embodiment, flickering occurring due to alignment precision during the manufacturing process can be suppressed. Further, with the present construction, a redundant structure is implemented regarding line dropout, thus improving yield. Further, the two gate lines traversing the dot comprise storing capacity Cs, so the aperture ratio does not drop.

Eighth Embodiment

Now, the eighth embodiment of the present invention will be described with reference to FIG. 15.

Figure 15:
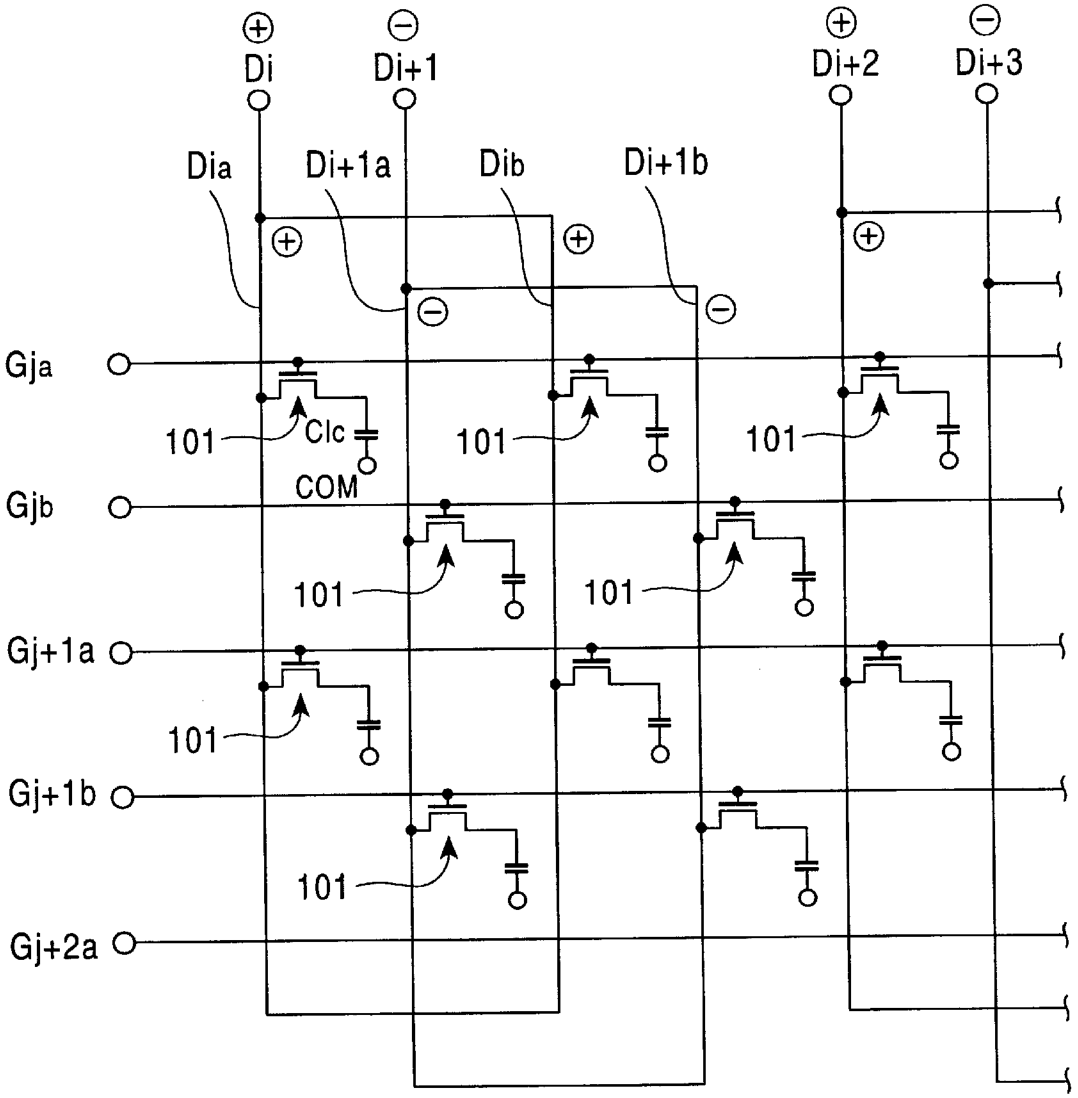
FIG. 15 is a diagram illustrating the construction of a eighth embodiment according to the present invention, an equivalent circuit of the matrix substrate.

FIG. 15 is a diagram illustrating an equivalent circuit of the active matrix type liquid crystal display device substrate. In FIG. 15, the storing capacity Cs has been omitted from the drawing for the sake of description.

As shown in FIG. 15, the active matrix type liquid crystal display device substrate according to the present embodiment has the TFTs 101 provided to the same side as the data lines Dia, Di+1a, Dib, Di+1b, and so forth (to the right in the drawing), and the positional relation of the source electrode and drain electrode is the same for all TFTs 101 on the substrate. Then, the neighboring data lines Dia and Dib, Di+1a and Di+1b, and so forth, are connected at both ends in units of two every other line.

For example, in the case of the sixth embodiment, the two neighboring data lines are connected, so in the event that data line inversion driving is employed for the data lines of which two lines comprise one set, in actual driving, the polarity does differ between the neighboring data lines in the set, but the polarity becomes the same between the dots corresponding to the mutually connected data lines, even though data line inversion driving is being carried out.

Conversely, with the present embodiment, every other data line is connected, so the polarity of all neighboring dots on the substrate are inverted by performing driving wherein the polarity is inverted for each of the data lines Di, Di+1, and so forth, in which two lines comprise one set. Accordingly, data line inversion functions effectively, and the effects of reducing cross-talk improves over the sixth embodiment.

Ninth Embodiment

Now, the ninth embodiment of the present invention will be described with reference to FIG. 16 and FIG. 17.

Figure 16:
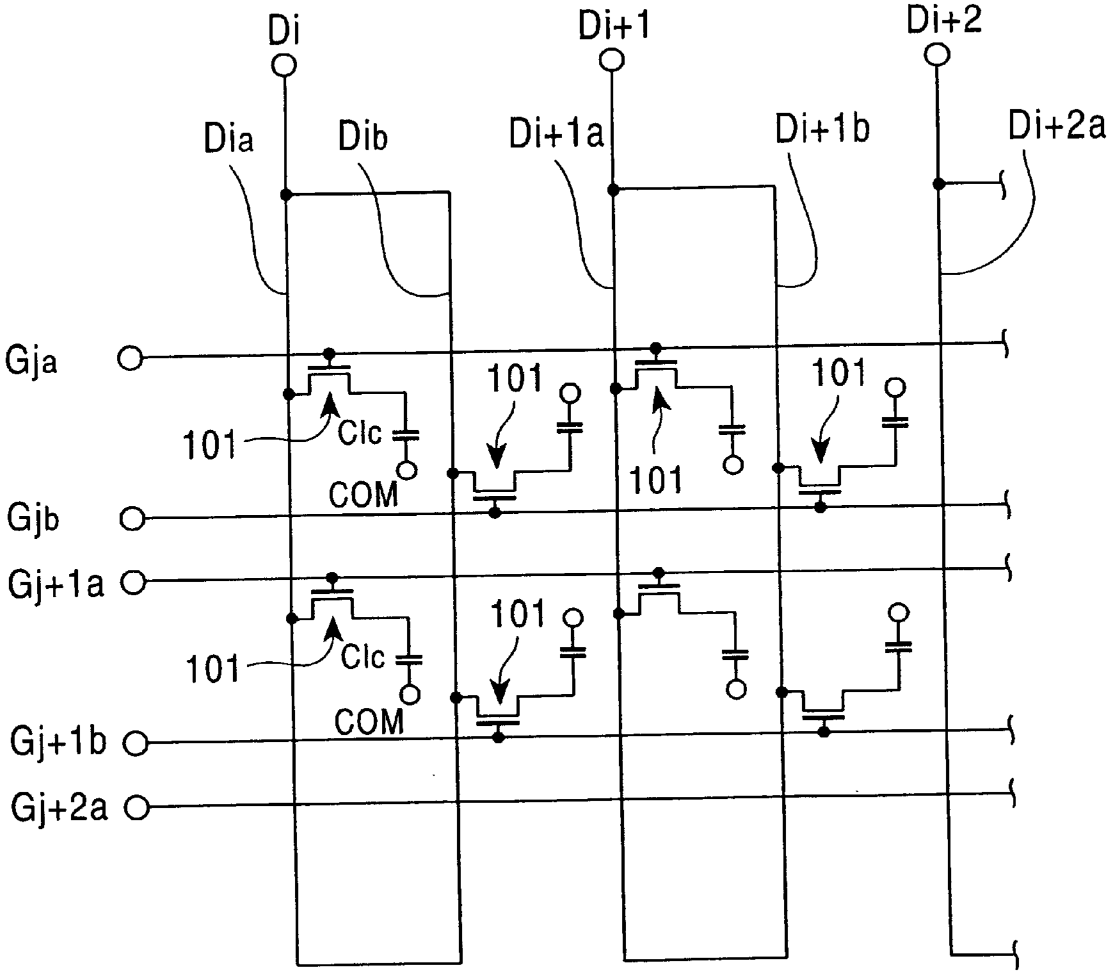
FIG. 16 is a diagram illustrating the construction of a ninth embodiment according to the present invention, an equivalent circuit of the matrix substrate.
Figure 17:
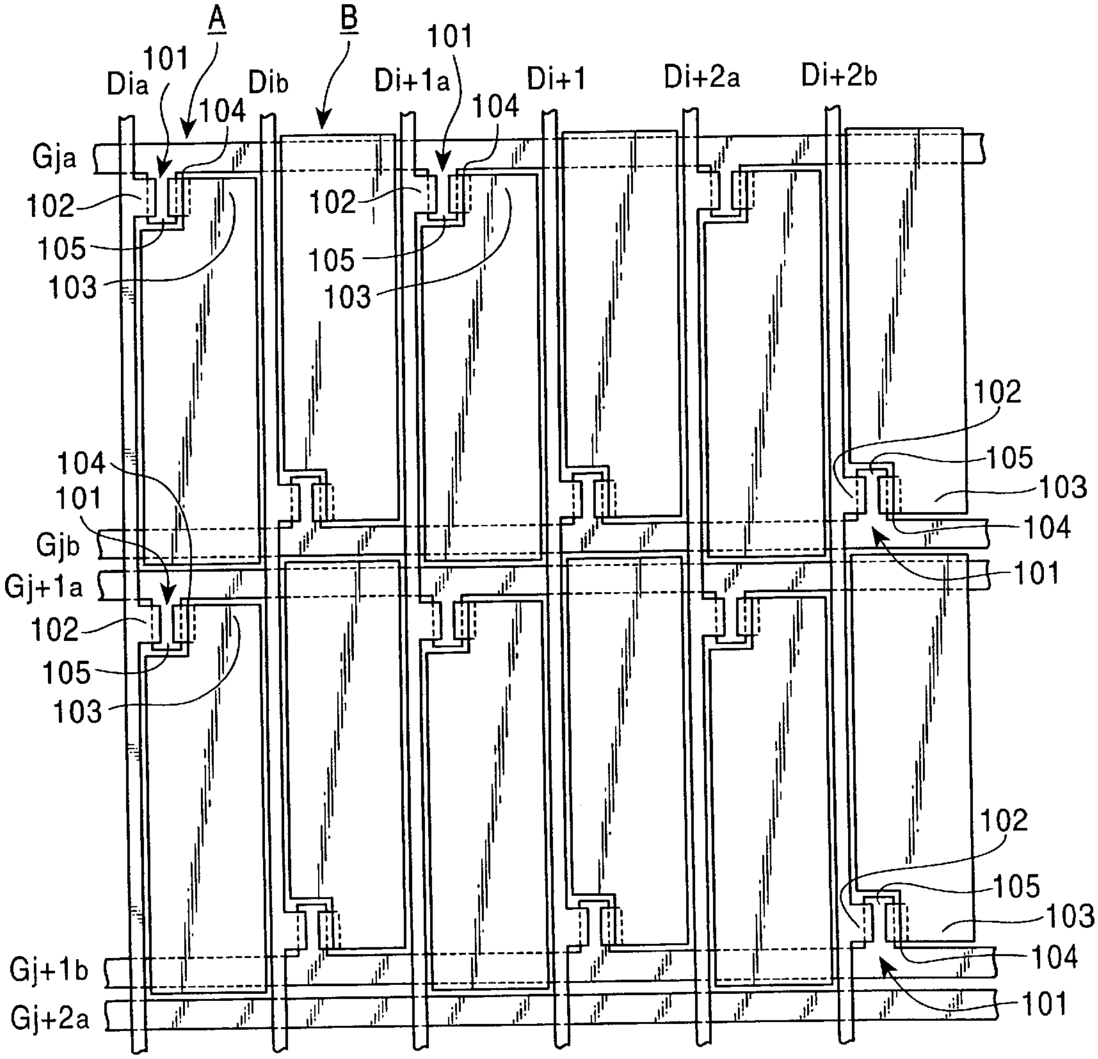
FIG. 17 is a plan view illustrating the layout of this matrix substrate.

FIG. 16 is a diagram illustrating an equivalent circuit of the active matrix type liquid crystal display device substrate, and FIG. 17 is a layout diagram. In FIG. 16, the storing capacity Cs has been omitted from the drawing for the sake of description.

As shown in FIGS. 16 and 17, the active matrix type liquid crystal display device substrate according to the present embodiment has the TFTs 101 provided to the same side as the data lines Dia, Di+1a, Dib, Di+1b, and so forth (to the right in the drawing), and the neighboring two data lines Dia and Dib, Di+1a and Di+1b, etc., are mutually connected. The gate electrodes 105 of the TFTs 101 corresponding to the set of the mutually connected two data lines Di are each connected to differing gate lines Gja, Gjb, and so forth. However, it should be noted that, unlike the sixth embodiment, the positioning of the gate lines Gja, Gjb, and so forth is not uniform; rather, the gate line with the subscript “b”, e.g., the gate line Gjb, is near the gate line Gj+1a of the next tier. As a result, looking at dot A at the upper left in FIG. 17 for example, and the dot B to the right thereof, the position of the TFTs 101 of these dots is in a line symmetry wherein the position of the TFT 101 of the dot A to the left is at the upper side of the dot A, and the position of the TFT 101 of the dot B to the right is at the lower side of the dot B.

That is, according to the present embodiment, the TFTs 101 of the dots are not in a positional relation of parallel movement, as with the sixth and eighth embodiments, but are positioned in line symmetry offset at every neighboring dot along the gate line. However, even with this embodiment, the positional relation of the source electrode 102 and drain electrode 104 to the gate electrode 105 is the same for all TFTs 101 on the substrate. According to this configuration, even if the alignment of the drain layer shifts as to the gate layer, all TFTs on the substrate shift in the same direction, so the gate-drain parasitic capacity becomes equal among the TFTs, and the offset voltage is uniform within the substrate. Accordingly, flickering which degrades image quality can be suppressed, as with the sixth and eighth embodiments.

Incidentally, with the sixth and eighth embodiments, the neighboring dots along the gate line are each offset by half a dot, forming a so-called delta array. Conversely, the present embodiment can be made to form a stripe array. Also, with the present embodiment, a gate line controlling a neighboring TFT does not traverse the center of a dot, so the storing capacity Cs is comprised with the gate line of the next tier or previous tier overlapping the end portion of this pixel electrode.

Tenth Embodiment

Figure 18A:
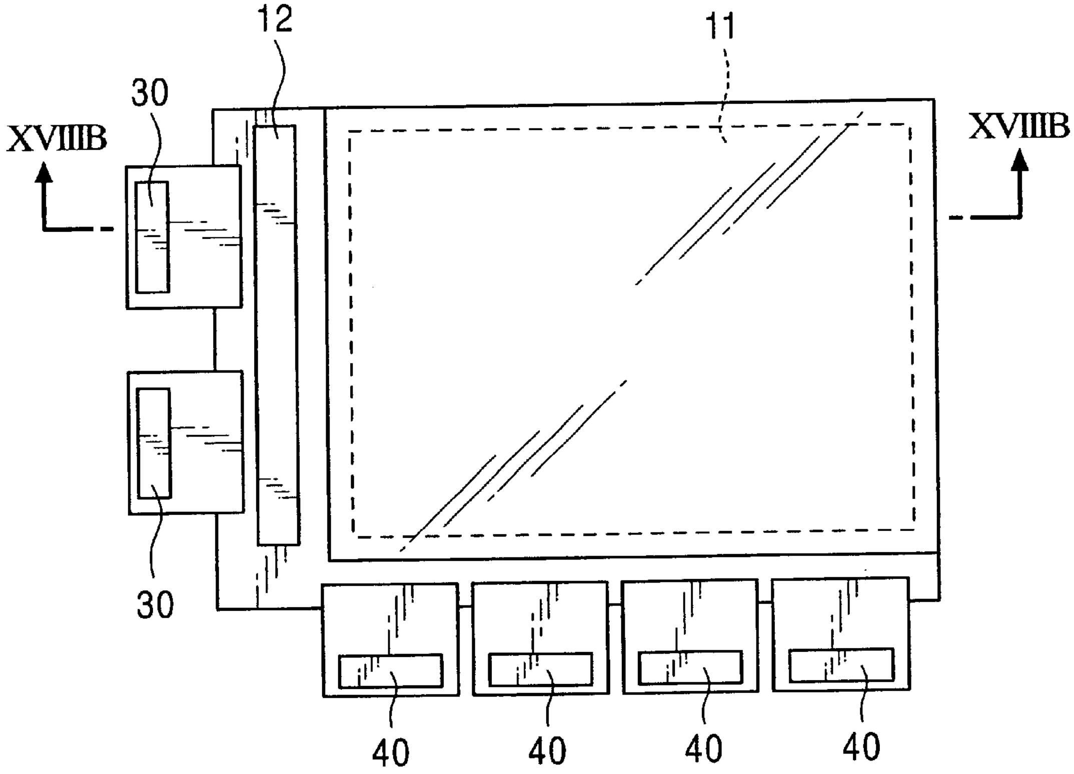
FIG. 18A is a plan view illustrating the construction of a tenth embodiment according to the present invention, an active matrix type liquid crystal display device.
Figure 18B:
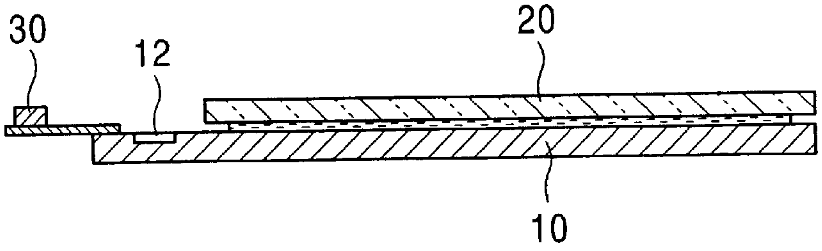
FIG. 18B is a cross-sectional view along line XVIIIB—XVIIIB in FIG. 18A.

FIG. 18A is a plan view illustrating the construction of a tenth embodiment according to the present invention, an active matrix type liquid crystal display device, and FIG. 18B is a cross-sectional view along line XVIIIB—XVIIIB in FIG. 18A. In these drawings, reference numeral 10 denotes a TFT substrate, upon which is formed a TFT matrix portion 11 formed of pixel electrodes, TFTS, storage capacity, data lines, and gate lines. The TFT matrix portion 11 described in the ninth embodiment will suffice here. Accordingly, redundant description will be omitted. Also, reference numeral 20 denotes an opposing substrate, upon which is formed a common electrode facing the pixel electrodes. The TFT substrate 10 and the opposing substrate 20 face one another across a certain gap, in which liquid crystal is sealed. Also, 30 denotes gate drivers and 40 denotes data drivers, each having 240 output terminals.

This active matrix type liquid crystal display device is a VGA liquid display panel with 1920 pixels in the column direction and 480 pixels in the row direction. Accordingly, the TFT matrix portion 11 has 960 data lines and 960 gate lines.

Then, in order to drive the 960 data lines, four data drivers 40 are externally attached to the TFT substrate 10. On the other hand, though four gate drivers 30 would be necessary since there are 960 gate lines, the number of gate drivers 30 is halved to two in the present embodiment by providing a demultiplexer portion 12 on the substrate in the present embodiment.

The demultiplexer portion 12 is formed of TFTs and signal wiring on the TFT substrate 10, and is formed at the same time as forming the TFT matrix portion 11 on the TFT substrate 10. Accordingly, there is no need to add a new manufacturing process for forming the demultiplexer portion 12 on the TFT substrate 10.

Figure 19:
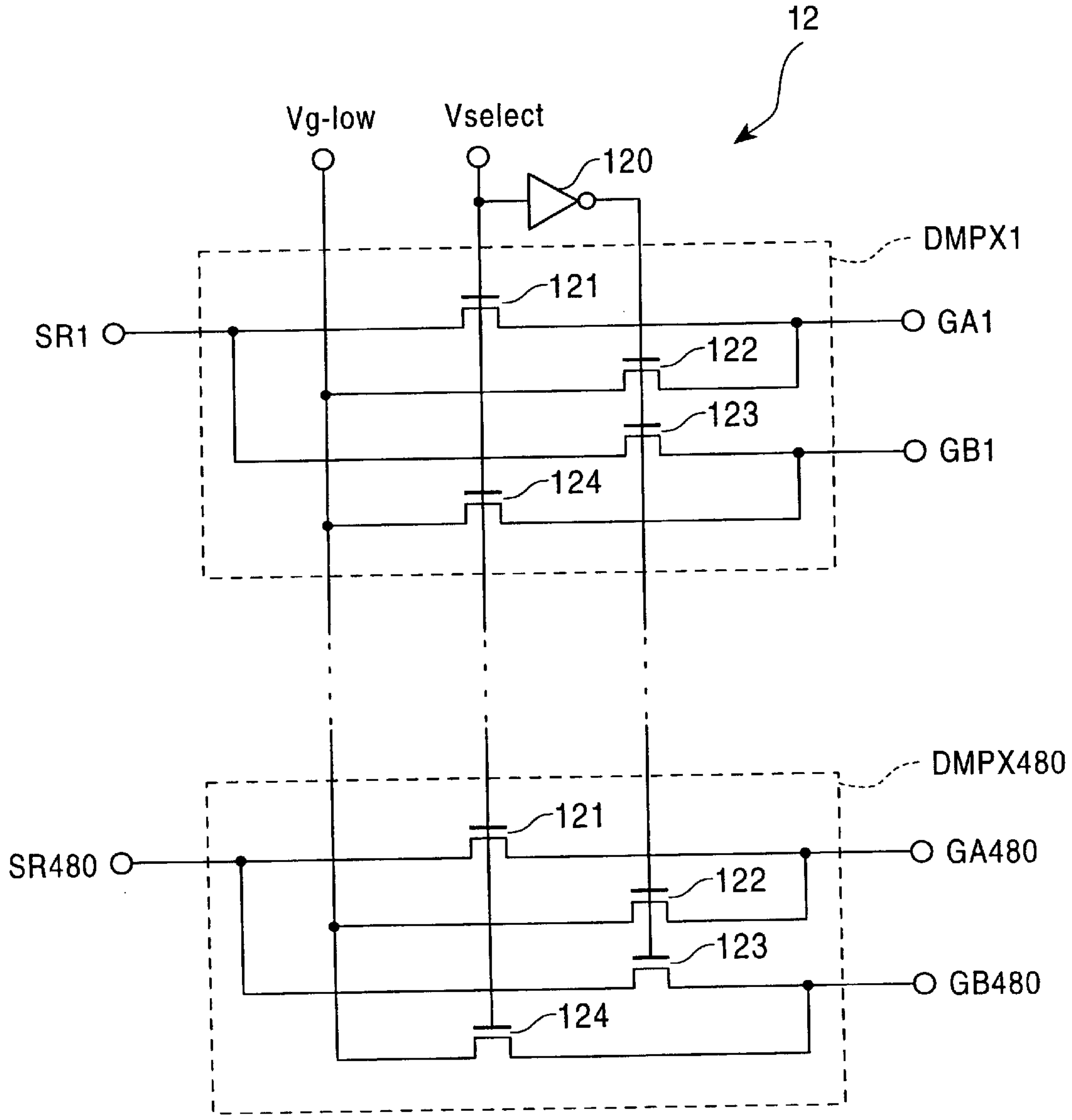
FIG. 19 is a circuit diagram illustrating the configuration of the demultiplexer portion in the this embodiment.

FIG. 19 illustrates the circuit configuration of the demultiplexer portion 12. As shown in FIG. 19, the demultiplexer portion 12 is comprised of an inverter 120 and 480 demultiplexers DMPX1 through DMPX480. Each demultiplexer has four TFT transfer gates 121 through 124. Switching signals Vselect are supplied to the transfer gates 121 and 124 from an unshown control circuit. Also, inverted signals are supplied to the transfer gates 122 and 123, these signals being the switching signals Vselect inverted by the inverter 120.

Next, the operation of the present embodiment will be described.

In each field cycle, 480 output signals SR1 through SR480 obtained from the two gate drivers 30 shown in FIGS. 18A and 18B are sequentially supplied to the input terminals of the demultiplexers DMPX1 through DMPX480. Also, the level of the switching signals Vselect is inverted each time the field cycle switches. Incidentally, in the following example, the transfer gates 121 through 124 are comprised of n-channel TFTs.

First, in the event that the level of the switching signal Vselect is high in an odd field cycle, the transfer gates 121 and 124 are on and the transfer gates 122 and 123 are off in the demultiplexers DMPX1 through DMPX480.

Accordingly, the output signals SR1 through SR480 sequentially output from the gate drivers in the odd field cycle are sequentially applied to the 480 first gate lines GA1 through GA480, via the transfer gates 121 of the demultiplexers DMPX1 through DMPX480. During this time, low-level reference voltage Vg-low is applied to the second gate lines GB1 through GB480, via the transfer gates 124 of the demultiplexers DMPX1 through DMPX480. Accordingly, during this time, all TFTs connected to the second gate lines in the TFT matrix portion 11 are off.

Next, the level of the switching signal Vselect switches to low in the even field cycle, so that the transfer gates 122 and 123 are on and the transfer gates 121 and 124 are off in the demultiplexers DMPX1 through DMPX480.

Accordingly, the output signals SR1 through SR480 sequentially output from the gate drivers in the odd field cycle are sequentially applied to the 480 first gate lines GB1 through GB480, via the transfer gates 123 of the demultiplexers DMPX1 through DMPX480. During this time, low-level reference voltage Vg-low is applied to the second gate lines GB1 through GB480, via the transfer gates 122 of the demultiplexers DMPX1 through DMPX480.

In this way, interlacing wherein the destination to which the gate driver supplies output signals is switched is performed, in the manner of supplying to the first gate lines in the odd field cycle and to the second gate lines in the even cycle, so the number of gate drivers can be cut in half.

Eleventh Embodiment

Figure 20A:
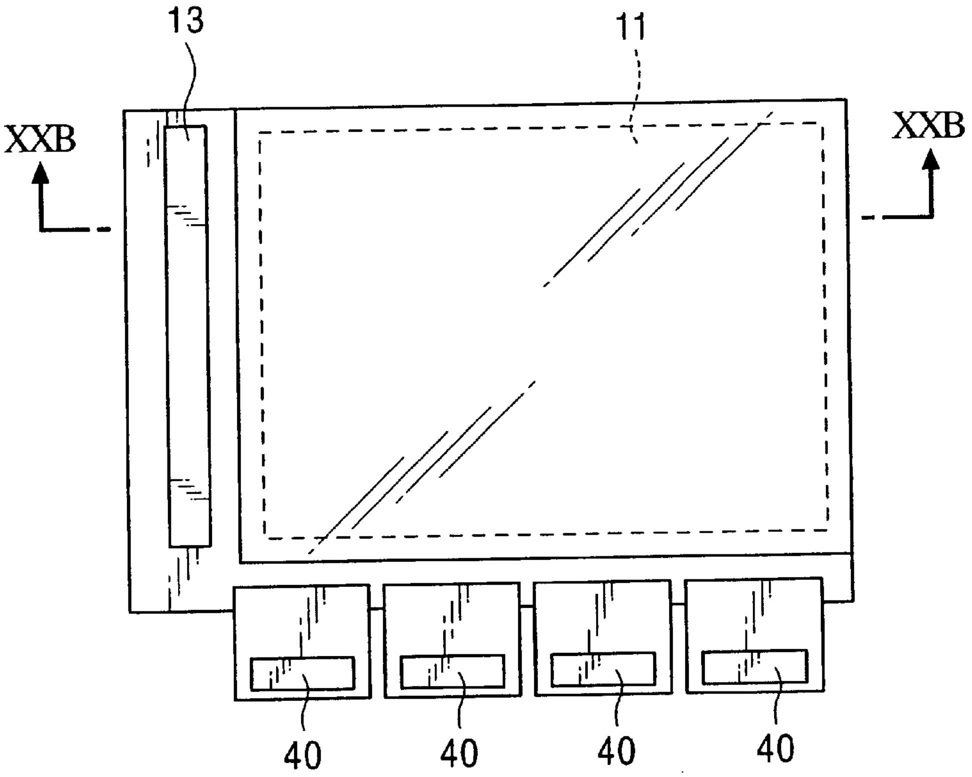
FIG. 20A is a plan view illustrating the construction of an eleventh embodiment according to the present invention, an active matrix type liquid crystal display device.
Figure 20B:
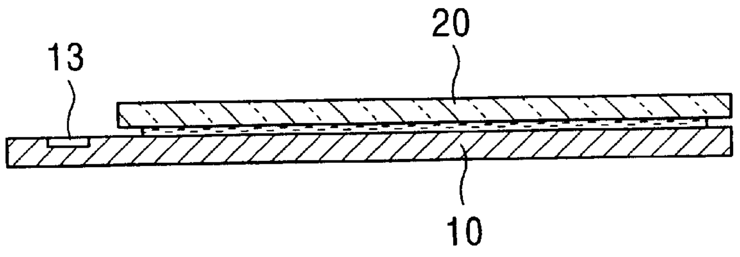
FIG. 20B is a cross-sectional view along line XXB—XXB in FIG. 20A.

FIG. 20A is a plan view illustrating the construction of an active matrix type liquid crystal display device according to the eleventh embodiment of the present invention, and FIG. 20B is a cross-sectional view along line XXB—XXB in FIG. 20A.

In the above tenth embodiment, the number of gate drivers 30 was reduced to half by forming a demultiplexer portion 12 on the TFT substrate 10. In the present embodiment, a shift register portion 13 is formed on the TFT substrate 10 instead of the demultiplexer portion 12, thereby doing away with the need for external gate drivers 30 altogether.

Figure 21:
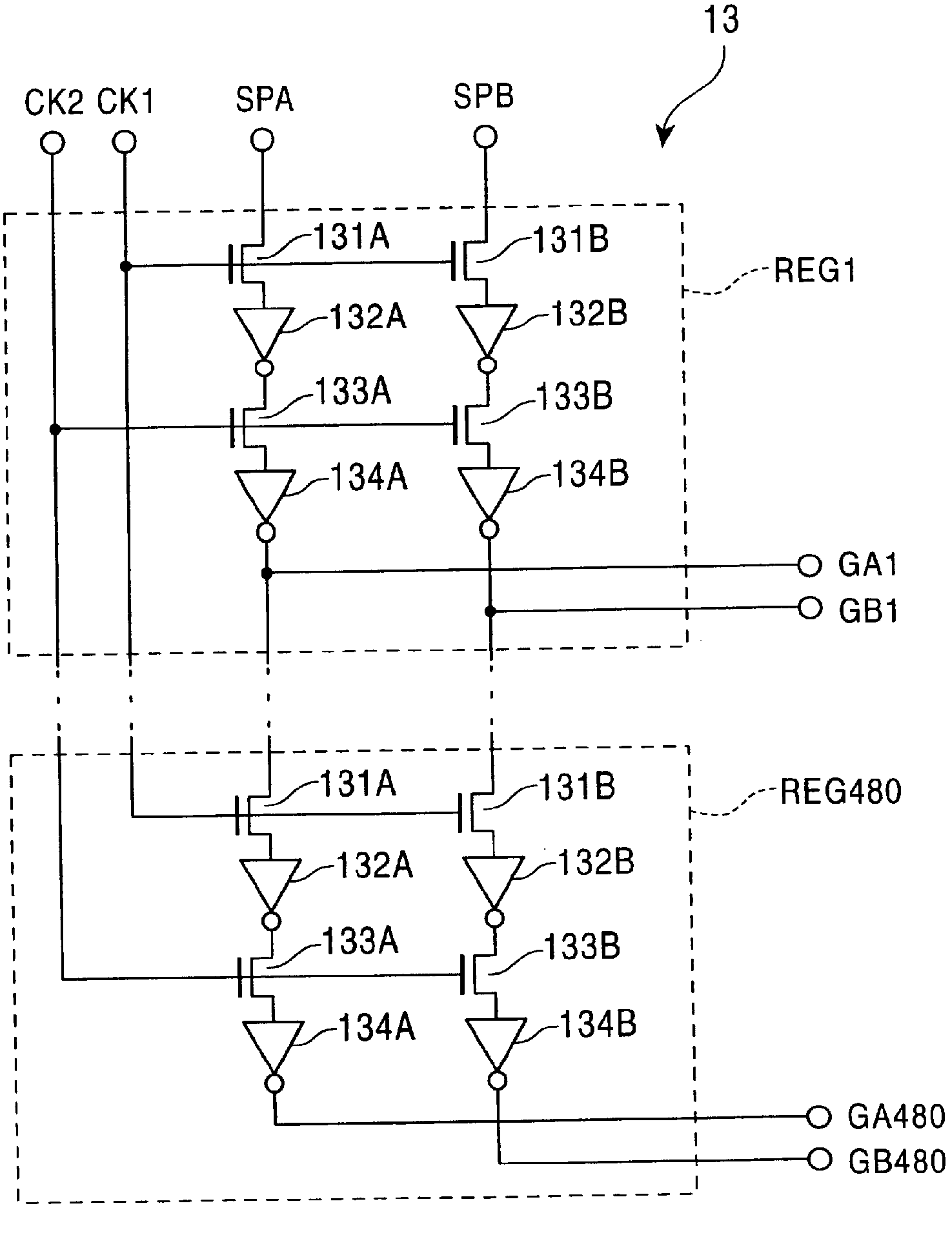
FIG. 21 is a circuit diagram illustrating the configuration of the shift register portion in the this embodiment.

FIG. 21 shows the circuit configuration of the shift register portion 13. As with the demultiplexer portion 12, the register portion 13 formed at the same time as forming the TFT matrix portion 11 on the TFT substrate 10.

As shown in FIG. 21, the shift register portion 13 is a cascade connection of 480 register portions REG1 through REG480. Each of the register portions comprised of a first flip-flop made up of a transfer gate 131A, an inverter 132A, a transfer gate 133A, and an inverter 134A; and a second flip-flop made up of a transfer gate 131B, an inverter 132B, a transfer gate 133B, and an inverter 134B. The output terminals of the first flip-flops of the register portions REG1 through REG480 (i.e., the output terminals of the inverters 134A) are each connected to the first gate lines GA1 through GA480 of the TFT matrix portion 11. On the other hand, the output terminals of the second flip-flops of the register portions REG1 through REG480 (i.e., the output terminals of the inverters 134B) are each connected to the second gate lines GB1 through GB480 of the TFT matrix portion 11.

Next, the operation of the present embodiment will be described.

Two phase clocks CK1 and CK2 are supplied to this shift register portion 13. Of these, the first phase clock CK1 is supplied to the transfer gates 131A and 131B of each register portion, and the second phase clock CK2 is supplied to the transfer gates 133A and 133B of each register portion.

Also, in the odd field cycle, a start pulse SPA is supplied to the first flip-flop of the register portion REG1 at the first tier at the time of starting. Accordingly, in the odd field cycle, the start pulse SPA sequentially shifts down the first flipflops of the cascaded register portions. Consequently, gate voltage equivalent to the start pulse SPA is sequentially output from the output terminals of the first flip-flops of each register portion (i.e., from the output terminal of the inverter 134A of each register portion), which is sequentially applied to the first gate lines GA1 through GA480.

Incidentally, in the odd field cycle, shifting action is performed through the second flip-flops of the register portions, but a low level signal is provided to the second flip-flop of the register portion REG1 at the first tier. Accordingly, in the odd field cycle, the second gate lines GB1 through GB480 are fixed at low level.

Also, in the even field cycle, a start pulse SPB is supplied to the second flip-flop of the register portion REG1 at the first tier at the time of starting. Accordingly, in the even field cycle, the start pulse SPB sequentially shifts down the second flip-flops of the cascaded register portions. Consequently, gate voltage equivalent to the start pulse SPB is sequentially output from the output terminals of the second flip-flops of each register portion (i.e., from the output terminal of the inverter 134B of each register portion), which is sequentially applied to the second gate lines GB1 through GB480.

Incidentally, in the even field cycle, shifting action is performed through the first flip-flops of the register portions, but a low level signal is provided to the first flip-flop of the register portion REG1 at the first tier, so the first gate lines GA1 through GA480 are fixed at low level.

In this way, according to the present embodiment, interlaced driving of the first and second gate lines of the TFT matrix portion 11 is performed by the shift register portion 13 formed on the TFT substrate 10, so there is no need to externally attach gate drivers, thereby reducing the number of parts, and facilitating reduction in the size and cost of the device.

Also, an arrangement may be used wherein a 480-tier shift register and the demultiplexer portion 12 from the tenth embodiment are formed on the TFT substrate 10 instead for providing a shift register portion 13 of the above construction. This arrangement yields similar advantages to those of the above eleventh embodiment.

Now, it is needless to say that the scope of art of the present invention is by no means restricted to the above embodiments; rather, various alterations may be made without departing from the spirit and scope of the present invention. For example, the above embodiments have been described with reference to interlaced driving as the driving method thereof, but non-interlaced driving may be employed, wherein the gate lines with the subscript "a" are scanned during ½ of a period 1H, and the gate lines with the subscript "b" are scanned during the remaining ½ of the period. Also, in the first embodiment, an arrangement was used wherein the storing capacity is formed simply by the pixel electrode and the gate line traversing the center thereof, but the pixel electrode may be extended so as to overlap the gate line of the next tier, further adding this portion as storing capacity. Also, the above embodiments have described examples wherein two or three data lines are electrically connected, but the number of data lines to be connected is not restricted to such. However, from a perspective of relation with display quality and the like, it is preferable that the number of data lines to be connected be up to around three or so.

As described above, with the active matrix type liquid crystal display device according to the present invention, the number of data lines is reduced to half of that of known arrangements, so the number of data driver required can be reduced, thereby lower the cost of the device and reducing the electrical power consumption thereof. The present invention is also advantageous in that even in cases of constructing a liquid crystal display panel with a small display area, the requirements to narrow the pitch in the data wiring terminal portion are not severely demanding.

Also, with the active matrix type liquid crystal display device according to the present invention, flickering due to the process precision (particularly the alignment precision of the exposing apparatus) can be suppressed according to this positional arrangement of the TFTs for each dot.

What is claimed is:

1. An active matrix type liquid crystal display device substrate;

wherein a plurality of data lines and a plurality of gate lines are provided on a substrate in a matrix form;

wherein on either side of each of said data lines are provided thin-film transistors connecting to said data lines and pixel electrodes connecting to said thin-film transistors so as to form desired pixel regions, corresponding with each of said plurality of gate lines;

wherein said plurality of data lines are provided so as to control said pixel electrodes on either side of said data lines, by signals from the corresponding one of the two gate lines on either side of each of said pixel electrodes;

wherein, in a region formed between neighboring data lines and between the two gate lines on either side of each of said pixel electrodes, two of said thin-film transistors are disposed, and two of said pixel electrodes connected to said thin-film transistors are arranged, and two of said gate lines are disposed between the regions having said two pixel electrodes which are adjacent to each other in the direction in which said data lines extend;

wherein each thin-film transistor comprises a source electrode, a gate electrode, and a drain electrode electrically connected with the pixel electrode and traversing substantially the entire gate line;

wherein storing capacity is provided corresponding to each of the pixel electrodes, and storing capacity lines are provided parallel to neighboring data lines, in a boundary region between two pixels which has no data line, between the two neighboring pixel electrodes between the neighboring data lines so that each pair of lines of pixels commonly has one storing capacity line; and wherein one of the electrodes of the storing capacity is connected to a pixel electrode corresponding thereto, and the other electrode is connected to the storing capacity line.

2. An active matrix type liquid crystal display device substrate according to claim 1, wherein the gate electrodes forming said thin-film transistors are comprised of the corresponding gate lines themselves;

and wherein drain electrodes traverse said gate electrodes in a direction orthogonal to said gate electrodes.

3. An active matrix type liquid crystal display device, comprising a pair of opposedly positioned substrates whereby liquid crystal is held between, wherein one of said substrates is a substrate according to claim 1.

4. An active matrix type liquid crystal display device according to claim 3, comprising scanning means wherein an action of sequentially supplying gate voltage to one of the two gate lines provided on either side of said pixel, and an action of sequentially supplying gate voltage to the other of the two gate lines provided on either side of said pixel, are alternatively performed each time a field cycle switches.

5. An active matrix type liquid crystal display device according to claim 3, comprising:

gate drivers for sequentially outputting gate voltage from output terminals in each field cycle; and demultiplexers wherein an action of sequentially supplying gate voltage to one of the two gate lines provided on either side of said pixel, and an action of sequentially supplying gate voltage to the other of the two gate lines provided on either side of said pixel, are alternatively performed each time a field cycle switches, said gate voltage being sequentially output from the output terminals of said gate drivers;

wherein said demultiplexer and said pixel are manufactured by the same manufacturing process.

6. An active matrix type liquid crystal display device according to claim 4, comprising:

a first shift register which sequentially shifts first start pulses and supplies output signals from each stage as gate voltage to one of the two gate lines provided on either side of each of said pixel electrodes; and a second shift register which sequentially shifts second start pulses and supplies output signals from each stage as gate voltage to the other of the two gate lines provided on either side of each of said pixel electrodes;

wherein said first and second shift registers, and said pixel are manufactured by the same manufacturing process.

7. An active matrix type liquid crystal display device according to claim 3, wherein, in said substrate, the gate electrodes forming said thin-film transistors are comprised of the corresponding gate lines themselves; and wherein the drain electrodes traverse said gate electrodes in a direction orthogonal to said gate electrodes.

8. An active matrix type liquid crystal display device according to claim 1, wherein each pair of thin-film transistors disposed in said region formed between said neighboring data lines and between the two gate lines on either side of each of said pixel electrodes are connected to the same gate line, and wherein said thin-film transistors disposed along a row parallel to said data lines are connected to alternating gate lines.

9. An active matrix type liquid crystal display device according to claim 1, wherein each pair of thin-film transistors disposed in said region formed between said neighboring data lines and between the two gate lines on either side of each of said pixel electrodes are connected to opposite gate lines, and wherein said thin-film transistors disposed along a row parallel to said data lines are connected to non-alternating gate lines.

10. An active matrix type liquid crystal display device according to claim 1, wherein each pair of thin-film transistors disposed in said region formed between said neighboring data lines and between the two gate lines on either side of each of said pixel electrodes are connected to opposite gate lines, and wherein said thin-film transistors disposed along a row parallel to said data lines are connected to alternating gate lines.

11. An active matrix type liquid crystal display device according to claim 1, wherein each pair of thin-film transistors disposed in said region formed between said neighboring data lines and between the two gate lines on either side of each of said pixel electrodes are connected to the same gate line, and wherein said thin-film transistors disposed along a row parallel to said data lines are connected to non-alternating gate lines.

12. An active matrix type liquid crystal display device according to claim 1, wherein an island formed between the source electrode and the drain electrode has a substantially smaller width than the gate line formed beneath the island.

13. An active matrix type liquid crystal display device according to claim 1, wherein an island formed between the source electrode and the drain electrode has a substantially larger width than the gate line formed beneath the island.

14. An active matrix type liquid crystal display device according to claim 1, wherein a portion of the drain electrode traversing the gate line is substantially thinner than a portion of the drain electrode electrically connected with the pixel electrode.

15. An active matrix type liquid crystal display device according to claim 4, wherein a signal voltage is output to each data line such that the signal voltage is applied to the neighboring data lines with the polarity thereof inverted.

16. An active matrix type liquid crystal display device substrate comprising:

a plurality of data lines and a plurality of gate lines provided on a substrate and arranged in a matrix;

thin-film transistors and pixel electrodes provided on either side of each of the data lines, the pixel electrodes and the data lines connected with the thin-film transistors, each thin-film transistor including a source electrode, a gate electrode integral with the one of the two gate lines on either side of the associated pixel electrode, and a drain electrode connected with the associated pixel electrode, the gate electrodes extending in a direction parallel with the data lines, each data line controlling pixel electrodes on either side of the data line using signals from one of the two gate lines on either side of the associated pixel electrode;

a storing capacity line disposed between neighboring data lines and neighboring pixel electrodes and parallel to the data lines; and a storing capacity corresponding to each pixel electrode, the storing capacity having a first electrode connected to with the pixel electrode corresponding thereto and a second electrode connected with the associated storing capacity line, wherein the pixel electrodes between neighboring data lines and neighboring gate lines have a common storing capacity line.

17. An active matrix type liquid crystal display device according to claim 16, wherein each pair of thin-film transistors disposed in a region formed between the neighboring data lines and between the two gate lines on either side of each of the pixel electrodes are connected to the same gate line, and wherein the thin-film transistors disposed along a row parallel to the data lines are connected to alternating gate lines.

18. An active matrix type liquid crystal display device according to claim 16, wherein each pair of thin-film transistors disposed in a region formed between the neighboring data lines and between the two gate lines on either side of each of the pixel electrodes are connected to opposite gate lines, and wherein the thin-film transistors disposed along a row parallel to the data lines are connected to non-alternating gate lines.

19. An active matrix type liquid crystal display device according to claim 16, wherein each pair of thin-film transistors disposed in the region formed between the neighboring data lines and between the two gate lines on either side of each of the pixel electrodes are connected to opposite gate lines, and wherein the thin-film transistors disposed along a row parallel to the data lines are connected to alternating gate lines.

20. An active matrix type liquid crystal display device according to claim 16, wherein each pair of thin-film transistors disposed in the region formed between the neighboring data lines and between the two gate lines on either side of each of the pixel electrodes are connected to the same gate line, and wherein the thin-film transistors disposed along a row parallel to the data lines are connected to non-alternating gate lines.

21. An active matrix type liquid crystal display device according to claim 16, wherein an island formed between the source electrode and the drain electrode has a substantially smaller width than the gate line formed beneath the island.

22. An active matrix type liquid crystal display device according to claim 16, wherein an island formed between the source electrode and the drain electrode has a substantially larger width than the gate line formed beneath the island.

23. An active matrix type liquid crystal display device according to claim 16, wherein a portion of the drain electrode traversing the gate line is substantially thinner than a portion of the drain electrode electrically connected with the pixel electrode.

24. An active matrix type liquid crystal display device, comprising a pair of opposedly positioned substrates whereby liquid crystal is held therebetween, wherein one of the substrates is a substrate according to claim 16.

25. An active matrix type liquid crystal display device according to claim 24, further comprising a scanning mechanism to alternately perform each time a field cycle switches, (1) sequentially supplying gate voltage to one of the two gate lines provided on either side of the pixel, and (2) sequentially supplying gate voltage to the other of the two gate lines provided on either side of the pixel.

26. An active matrix type liquid crystal display device according to claim 24, further comprising:

gate drivers to sequentially output gate voltage from output terminals in each field cycle; and demultiplexers to alternately perform, each time a field cycle switches, (1) sequentially supplying gate voltage to one of the two gate lines provided on either side of the pixel, and (2) sequentially supplying gate voltage to the other of the two gate lines provided on either side of the pixel, the gate voltage being sequentially output from the output terminals of each gate drivers;

wherein the demultiplexer and the pixel are manufactured by the same manufacturing process.

27. An active matrix type liquid crystal display device according to claim 24, further comprising:

a first shift register which sequentially shifts first start pulses and supplies output signals from each stage as gate voltage to one of the two gate lines provided on either side of each of the pixel electrodes; and a second shift register which sequentially shifts second start pulses and supplies output signals from each stage as gate voltage to the other of the two gate lines provided on either side of each of the pixel electrodes;

wherein the first and second shift registers, and the pixel are manufactured by the same manufacturing process.

28. An active matrix type liquid crystal display device according to claim 24, wherein a signal voltage is output to each data line such that the signal voltage is applied to the neighboring data lines with the polarity thereof inverted.

29. An active matrix type liquid crystal display device substrate comprising:

a plurality of data lines and a plurality of gate lines provided on a substrate and arranged in a matrix; and thin-film transistors and pixel electrodes provided on either side of each of the data lines, the pixel electrodes and the data lines connected with the thin-film transistors, each thin-film transistor including a source electrode, a gate electrode, and a drain electrode connected with the associated pixel electrode and completely traversing the entire gate line, each data line controlling pixel electrodes on either side of the data line using signals from one of the two gate lines on either side of the associated pixel electrodes, wherein each pair of thin-film transistors disposed in a region formed between the neighboring data lines and between the two gate lines on either side of each of the pixel electrodes are connected to the same gate line, and wherein the thin-film transistors disposed along a row parallel to the data lines are connected to alternating gate lines.

30. An active matrix type liquid crystal display device according to claim 29, an island formed between the source electrode and the drain electrode has a substantially smaller width than the gate line formed beneath the island.

31. An active matrix type liquid crystal display device according to claim 29, wherein an island formed between the source electrode and the drain electrode has a substantially larger width than the gate line formed beneath the island.

32. An active matrix type liquid crystal display device according to claim 29, herein a portion of the drain electrode traversing the gate line is substantially thinner than a portion of the drain electrode electrically connected with the pixel electrode.

33. An active matrix type liquid crystal display device, comprising a pair of opposedly positioned substrates whereby liquid crystal is held therebetween, wherein one of the substrates is a substrate according to claim 29.

34. An active matrix type liquid crystal display device according to claim 33, further comprising a scanning mechanism to alternately perform each time a field cycle switches, (1) sequentially supplying gate voltage to one of the two gate lines provided on either side of the pixel, and (2) sequentially supplying gate voltage to the other of the two gate lines provided on either side of the pixel.

35. An active matrix type liquid crystal display device according to claim 33, further comprising:

gate drivers to sequentially output gate voltage from output terminals in each field cycle; and demultiplexers to alternately perform, each time a field cycle switches, (1) sequentially supplying gate voltage to one of the two gate lines provided on either side of the pixel, and (2) sequentially supplying gate voltage to the other of the two gate lines provided on either side of the pixel, the gate voltage being sequentially output from the output terminals of each gate drivers;

wherein the demultiplexer and the pixel are manufactured by the same manufacturing process.

36. An active matrix type liquid crystal display device according to claim 33, further comprising:

a first shift register which sequentially shifts first start pulses and supplies output signals from each stage as gate voltage to one of the two gate lines provided on either side of each of the pixel electrodes; and a second shift register which sequentially shifts second start pulses and supplies output signals from each stage as gate voltage to the other of the two gate lines provided on either side of each of the pixel electrodes;

wherein the first and second shift registers, and the pixel are manufactured by the same manufacturing process.

37. An active matrix type liquid crystal display device according to claim 33, wherein a signal voltage is output to each data line such that the signal voltage is applied to the neighboring data lines with the polarity thereof inverted.

* * * * *

UNITED STATES PATENT AND TRADEMARK OFFICE

CERTIFICATE OF CORRECTION

PATENT NO. : 6,707,441 B1
DATED : March 16, 2004
INVENTOR(S) : Hiroyuki Hebiguchi et al.

It is certified that error appears in the above-identified patent and that said Letters Patent is hereby corrected as shown below:

Column 23,
Line 14, delete "electrodes," and substitute -- electrode, -- in its place.

Column 24,
Line 2, after "29," and before "an island" insert -- wherein --.

Signed and Sealed this

Thirteenth Day of July, 2004

JON W. DUDAS
*Acting Director of the United States Patent and Trademark Office*